US009690498B2

(12) United States Patent
Hutchison et al.

(10) Patent No.: US 9,690,498 B2
(45) Date of Patent: Jun. 27, 2017

(54) PROTECTED MODE FOR SECURING COMPUTING DEVICES

(71) Applicant: L-3 Communications Corporation, New York, NY (US)

(72) Inventors: Jerry Hutchison, Huntington Valley, PA (US); Robert Coia, Lower Gwynedd, PA (US)

(73) Assignee: L3 TECHNOLOGIES, INC., New York, NY (US)

( * ) Notice: Subject to any disclaimer, the term of this patent is extended or adjusted under 35 U.S.C. 154(b) by 126 days.

(21) Appl. No.: 14/675,685

(22) Filed: Mar. 31, 2015

(65) Prior Publication Data

US 2015/0212747 A1 Jul. 30, 2015

Related U.S. Application Data

(62) Division of application No. 13/967,156, filed on Aug. 14, 2013, now abandoned.

(51) Int. Cl.
*G06F 21/57* (2013.01)
*G06F 3/06* (2006.01)
(Continued)

(52) U.S. Cl.
CPC .......... *G06F 3/0617* (2013.01); *G06F 3/0632* (2013.01); *G06F 3/0673* (2013.01);
(Continued)

(58) Field of Classification Search
None
See application file for complete search history.

(56) References Cited

U.S. PATENT DOCUMENTS 5,991,774 A * 11/1999 Tate .................. G06F 11/006
707/697
6,115,819 A 9/2000 Anderson
(Continued)

OTHER PUBLICATIONS

NIST Special Publication 800-164, Guidelines on Hardware—Rooted Security in Mobile Devices (draft), Oct. 2012.
(Continued)

*Primary Examiner* — Malcolm Cribbs
(74) *Attorney, Agent, or Firm* — Condo Roccia Koptiw LLP

(57) ABSTRACT

Methods and systems are disclosed for testing and/or validating that an untrusted device is operating according to an expected state or configuration. The methods and systems may be designed such that the volatile memory of the untrusted device is brought to a known state for validation, for example upon ingress to or egress from a protected mode of operation. The device may execute a first operating system when operating outside of the protected mode. Upon determining to transition to protected mode, an operational image of a second operating system may be loaded into the device. The device may write a pattern to unused memory for validation. The device may receive a first challenge request from a trusted monitor (TM). In order to be successfully validated, the device may answer the challenge correctly within a given response window based on the current state of its volatile memory.

21 Claims, 7 Drawing Sheets

(51) Int. Cl.
*G06F 21/53* (2013.01)
*G06F 21/54* (2013.01)

(52) U.S. Cl.
CPC .............. *G06F 21/53* (2013.01); *G06F 21/54* (2013.01); *G06F 21/57* (2013.01)

(56) References Cited

U.S. PATENT DOCUMENTS

| | | | |
|---|---|---|---|
| 6,381,715 B1 | 4/2002 | Bauman et al. | |
| 6,694,468 B1 | 2/2004 | Sun et al. | |
| 7,134,024 B1 | 11/2006 | Binding et al. | |
| 7,302,698 B1 | 11/2007 | Proudler et al. | |
| 7,313,679 B2 | 12/2007 | Ranganathan | |
| 7,908,483 B2 | 3/2011 | Iliev et al. | |
| 2001/0007972 A1* | 7/2001 | Araki | G01R 31/31835 703/16 |
| 2003/0079078 A1* | 4/2003 | Zipprich | G06F 21/80 711/112 |
| 2003/0188170 A1* | 10/2003 | Bidan | G06Q 20/341 713/182 |
| 2004/0019802 A1* | 1/2004 | Hartlieb | G06F 9/3836 726/16 |
| 2004/0123137 A1 | 6/2004 | Yodaiken | |
| 2004/0158736 A1 | 8/2004 | Watt et al. | |
| 2005/0038790 A1 | 2/2005 | Wolthusen | |
| 2005/0108608 A1* | 5/2005 | Chee Hong | G01R 31/318357 714/741 |
| 2005/0135608 A1* | 6/2005 | Zheng | H04L 9/0662 380/28 |
| 2007/0101236 A1* | 5/2007 | Bauerle | G06F 11/1004 714/763 |
| 2007/0202915 A1* | 8/2007 | Karaoguz | H04W 8/183 455/550.1 |
| 2007/0294496 A1* | 12/2007 | Goss | G06F 12/1408 711/163 |
| 2008/0092145 A1 | 4/2008 | Sun et al. | |
| 2008/0147908 A1* | 6/2008 | Lahti | G06F 11/1004 710/23 |
| 2008/0270776 A1* | 10/2008 | Totolos | G06F 11/1441 713/1 |
| 2009/0094150 A1 | 4/2009 | Feng et al. | |
| 2009/0100303 A1* | 4/2009 | McGoldrick | G01R 31/31726 714/720 |
| 2009/0204823 A1 | 8/2009 | Giordano et al. | |
| 2009/0254761 A1* | 10/2009 | Thiebeauld De La Crouee | G06F 21/51 713/193 |
| 2009/0307783 A1 | 12/2009 | Maeda et al. | |
| 2010/0100964 A1 | 4/2010 | Mahaffey et al. | |
| 2010/0299458 A1 | 11/2010 | Marking et al. | |
| 2011/0004793 A1* | 1/2011 | Sul | G11C 29/003 714/718 |
| 2011/0030040 A1 | 2/2011 | Ronchi et al. | |
| 2012/0066509 A1 | 3/2012 | Lapp et al. | |
| 2012/0079287 A1 | 3/2012 | Leclercq | |
| 2012/0102314 A1 | 4/2012 | Zheng et al. | |
| 2012/0131399 A1 | 5/2012 | Henrion et al. | |
| 2012/0269346 A1 | 10/2012 | Best et al. | |
| 2012/0291101 A1 | 11/2012 | Ahlstrom et al. | |
| 2013/0067245 A1 | 3/2013 | Horovitz et al. | |
| 2013/0111211 A1 | 5/2013 | Winslow et al. | |
| 2014/0337918 A1 | 11/2014 | Siddiqi et al. | |
| 2014/0359793 A1 | 12/2014 | Dobson et al. | |
| 2015/0200934 A1* | 7/2015 | Naguib | G06F 21/57 713/2 |

OTHER PUBLICATIONS

Dissecting Android Malware: Characterization and Evolution, Yajin Zhou et al, Proceedings of the 20th Network and Distributed System Security Symposium (NDSS 2013), San Diego, CA, Feb. 2013. Note similar paper presented at IEEE Symposium on Security and Privacy, San Francisco, CA, May 20, 2012.

Countering Kernel Rootkits with Lightweight Hook Protection, Zhi Wang, Xuxian Jiang, et al, CCS'09, Nov. 9-13, 2009, Chicago, Illinois, USA.

"Detecting Kernel-level Rootkits using Data Structure Invariants." Arati Baliga, Vinod Ganapathy, Liviu Iftode. IEEE Transactions on Dependable and Secure Computing (TDSC); vol. 8, No. 5, pp. 670-684; Sep./Oct. 2011.

"Automatic Inference and Enforcement of Kernel Data Structure Invariants." Arati Baliga, Vinod Ganapathy, Liviu Iftode. Proceedings of the 24th Annual Computer Security Applications Conference (ACSAC 2008); pp. 77-86; Anaheim, California; Dec. 8-12, 2008.

Baliga, Arati, Vinod Ganapathy, and Liviu Iftode. "Automatic Inference and Enforcement of Kernel Data Structure Invariants." Proceedings of the 24th Annual Computer Security Applications Conference. Annual Computer Security and Applications Conference, Anaheim, California. Dec. 2008. pp. 1-22.

"Rootkits on Smart Phones: Attacks, Implications and Opportunities." Jeffrey Bickford, Ryan O'Hare, Arati Baliga, Vinod Ganapathy, Liviu Iftode. Proceedings of the 11th International Workshop on Mobile Computing Systems and Applications (HotMobile 2010); pp. 49-54; Annapolis, Maryland; Feb. 22-23, 2010.

\* cited by examiner

PROTECTED MODE FOR SECURING COMPUTING DEVICES

CROSS REFERENCE TO RELATED APPLICATIONS

This application is a divisional of U.S. patent application Ser. No. 13/967,156, filed on Aug. 14, 2013 which is hereby incorporated by reference as if fully set forth herein.

BACKGROUND

Commercial off-the-shelf (COTS) hardware and software may be products that are freely available in a commercial marketplace and may generally be available for public use. COTS products often have the benefit of being low-cost and easily replaced. Additionally, COTS products are often upgradable in ways that often benefit consumers. As an example, today there are a multitude of COTS mobile devices (e.g., smartphones, tablets, laptops, etc.) available that have a multitude of different functions and capabilities depending on the desired application of the user. The COTS devices may execute various types of operating systems and software, for example iOS, Android, and/or Windows. The large number of features and high degree of customization of COTS devices make them desirable to various types of users and for a wide range of uses. However, COTS devices may also be an attack target for a plethora of diverse threats.

For example, in many instances COTS products may lack certain security features that allow the product to be fully utilized or trusted. For example, COTS communication devices may be unable to achieve basic trust and robustness with software that may or may not be trustworthy. Thus, a traditional COTS communication device may be unable to provide the high levels of assurance or security necessary to protect various types of sensitive data.

SUMMARY

Methods and systems are disclosed for operating a COTS device according to a protected mode of operation and an unprotected mode of operation. Methods and systems are disclosed for testing and/or validating that an otherwise untrusted device—such as a COTS smartphone—is operating according to an expected state or configuration. The methods and systems may be designed such that the volatile memory of the untrusted device is brought to a known state for validation, for example upon ingress to or egress from a protected mode of operation.

For example, methods and systems for operating a device to be secured in a protected mode of operation are disclosed. Such methods and systems may include operating the device outside of the protected mode. The device may execute a first operating system when operating outside of the protected mode. It may be determined to transition the device into the protected mode. In order to save a session associated with operation outside of the protected mode, upon determining to transition the device into the protected mode the device may hibernate the first operating system. For example, hibernating the first operating system may include storing operational data for the operating system in non-volatile memory of the device. Upon determining to transition to protected mode, an operational image of a second operating system may be operated on the device. For example, the operational image of the second operating system may be copied to volatile memory. While in protected mode, the device may operate using the operational image of the second operating system. While operating in protected mode, the operational image of the second operating system may be static or unchangeable. It may then be determined to transition the device out of the protected mode. Prior to exiting protected mode, the device may return one or more portions of volatile memory to their original state as configured upon entering protected mode. For example, the device may remove any programs or software that were installed during protected mode operation and/or return volatile memory to its initial configuration upon entering protected mode. Upon transitioning the device out of the protected mode, the device may be configured to restore the first operating system using the operational data stored in non-volatile memory.

The device may send a challenge request to a trusted monitor (TM) and may receive a first challenge from the TM. The first challenge may be received based on the device transitioning into the protected mode. The first challenge request may indicate one or more memory regions of the device that are to be validated by the TM. The memory region to be validated may be associated with at least a portion of the operational image of the second operating system and a region of volatile memory that is unused or idle. The device may determine a first challenge response based on the first challenge. The device may send the first challenge response to the TM. If the TM successfully validates the device based on the first challenge response, the device may then access to operate on sensitive data (e.g., operate in the protected mode). While in protected mode, the TM may periodically and/or intermittently provide challenges to the device to ensure the device is operating in accordance with its protected mode configuration. For example, the TM may challenge the device to ensure that the operational image of the second operating has not been altered. The device may send a second challenge request to the TM and may receive a second (e.g., or third, or fourth, etc.) challenge from the TM. The second challenge may be received based on the device transitioning out of the protected mode. The device may determine a second challenge response based on the second challenge. The device may send the second challenge response to the TM. Upon completing the second challenge, the device may exit the protected mode.

In order to bring unused volatile memory to a known state for validation, a pattern may be written to an unused memory region in order to answer the one or more challenges. For example, a given value to be written in the pattern for a given memory address may be inexpressible as a closed form function of the memory address in order to prevent spoofing. The value to be written in the pattern for a given memory address may be dependent on the order in which the memory address was treated in the pattern. The pattern written to memory may be different for each challenge. A pattern may be written to any volatile memory locations not associated with storage of the operational image of the operating system utilized in protected mode, not associated with the storage of one or more utilities or programs utilized during protected mode (e.g., whose code is known to the TM), and/or not associated with sensitive data utilized during protected mode (e.g., whose values are known to the TM).

When bringing the volatile memory to a known state for validation, the device being validated may receive a plurality of challenge parameters. For example, the plurality of challenge parameters may include one or more of a random number, an indication of one or more memory regions to which the challenge is being applied, and/or an indication of a number of pattern generator cycles over which to apply the pattern to selected memory addresses. The device may then write an operational image of an operating system to a first portion of the volatile memory. The device may write a pattern to at least one portion of unused volatile memory. For example, at least one memory address to use for the pattern may be selected in a pseudorandom manner. A value to write to the at least one memory address may be determined based on a value that was stored at another memory address in the volatile memory and a value of a counter that was initialized upon beginning the pattern. For example, the another memory address may be an adjacent memory address to the at least one memory address.

Upon loading the operational image of the operating system and writing the pattern to unused memory, the device may perform a integrity checksum across the volatile memory (e.g., once the volatile memory has been brought to the known state). The device may transmit the result of the integrity checksum to a trusted monitor (TM) for validation. For example, the integrity checksum may be performed first over memory values corresponding to the operational image of an operating system and then across the at least one portion of unused volatile memory.

The pattern may be written in such a way so as spoofing the challenge is difficult to achieve within an expected response time window without actually writing the pattern to physical memory addresses. For example, a subsequent memory address to which the pattern is written may be selected pseudorandomly based a new (e.g., incremented) value of the counter. The first memory address in the pattern maybe selected based on the random number. For example, the first memory address in the pattern may be selected based on a result of a hash function being applied to the counter and the random number.

The unused volatile memory may be initialized prior to beginning pattern writing. For example, at least one portion of unused volatile memory may be initialized based on the random number. As an example, initializing the at least one portion of unused volatile memory based on the random number may include storing the random number at a first determined memory address in the unused volatile memory, incrementing the random number, storing the incremented random number at a next determined memory location, and repeating the incrementing of the random number and storing each iteration at a subsequent memory address until the at least one portion of unused volatile memory has been initialized. The initialization may be performed such that, once initialized, the unused memory region includes approximately the same number of binary zeros and ones (e.g., the number of zeros does not exceed the number of ones by more than a given threshold and vice versa).

A trusted monitor (TM) is disclosed for validating that volatile memory of an untrusted device is configured in a known state. For example, the TM may include a communication device configured to send a challenge to the untrusted device. The challenge may include an indication of a memory region, a random number, and a number of pattern generator cycles over which to apply a generated pattern to selected memory addresses. The TM may include a processor configured to independently determine the proper challenge response based on an expected state of the volatile memory of the untrusted device and one or more challenge parameters included in the challenge request. The expected state of the volatile memory of the untrusted device may include a first region configured to store an operational image of an operating system and a second region configured to store a pattern. The processor may be further configured to determine an expected challenge response based on the expected state of the volatile memory of the untrusted device. For example, the expected challenge response may include a result of a hash function being applied across data corresponding to the expected state of the volatile memory. The processor may be further configured to determine an expected response window (e.g., in the time domain, such as a time at which the TM expects a response from the untrusted device) based the challenge request and a configuration of the untrusted device (e.g., processor speed, memory size, etc.). The processor may be further configured to determine that validation of the untrusted device is successful based on the TM receiving a challenge response within the response window that comprises the expected challenge response. The TM may be configured to send the challenge request based on one the untrusted device transitioning into a protected mode of operation. The TM may be configured to send the challenge request based on or the untrusted device transitioning out of the protected mode of operation. The TM may periodically and/or intermittently send challenges to the untrusted device while the device is operating in the protected mode.

An internal reference monitor (IRM) may be an example of a TM that is used to validate that the memory of the device that includes the IRM is stored in an expected state. For example, a device may be configured to execute an operating system. The device may include memory configured to store an operational image of the operating system. The memory may also store a pattern that is written to at least a portion of the memory that is not occupied by the operational image of the operating system. The device may include an internal reference monitor (IRM). The IRM may be configured to validate that the memory is configured to store the operational image of the operating system and the pattern. For example, at least one memory address used for the pattern may be selected based on a result of a pseudorandom function. A value of a counter initialized at the beginning of the pattern may be an input to the pseudorandom function. A value written to the at least one memory address may be determined based on a value that was stored at another memory address in the memory and the value of the counter used as the input to the pseudorandom function (e.g., the order in which the memory address is written in the pattern may affect the value written to the memory address). As an example, the pseudorandom function may comprise a hash function.

BRIEF DESCRIPTION OF THE DRAWINGS

The following detailed description may be best understood when taken in conjunction with the accompanying drawings, of which.

DETAILED DESCRIPTION

Figure 1:
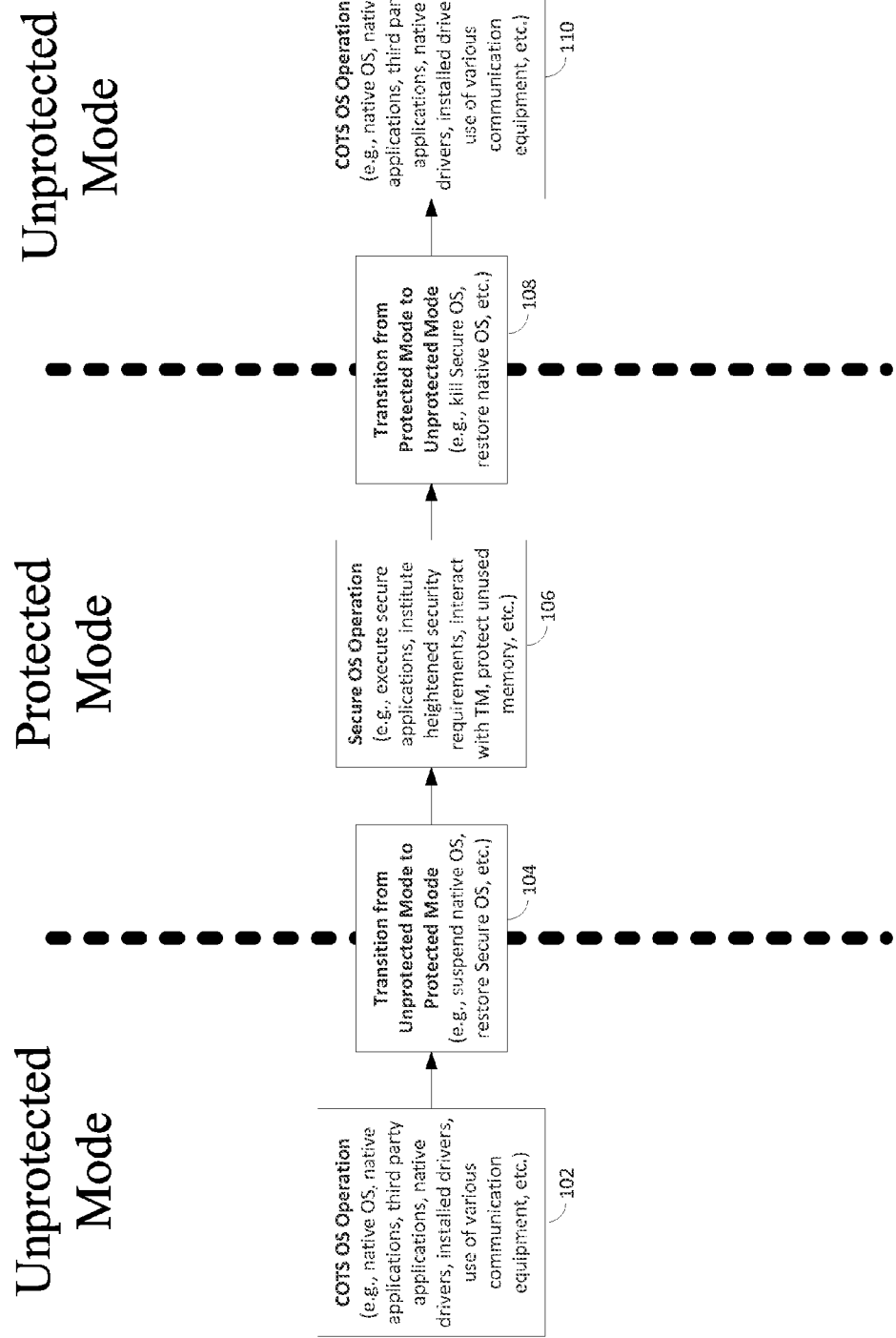
FIG. 1 illustrates an example flow for transition a device into and out of protected mode.

As the functionality associated with COTS communication devices (e.g., cell phones, smartphones, tablets, personal computers (PCs), laptops, workstations, etc.) continues to increase, the proliferation of these devices in the market has also dramatically increased. COTS devices often offer the benefits of providing state-of-the-art services and functionality, while also being easily upgradable and very user-friendly.

When used herein, the term COTS device may refer to any computing device capable of communicating over a network or performing processing tasks on behalf of a user. Although the examples described herein may be in terms of providing security or trust for a COTS smartphone or COTS workstation, the systems and methods disclosed herein may be equally applicable to any computing device or communication device for which additional security is desired. For example, the systems and methods disclosed herein may be applicable for providing additional security for cell phones, pagers, PCs, laptops, vehicles, kiosks, facilities, servers, workstations, tablets, smartphones, routers, modems, local area networks (LANs), processors, controllers, microcontrollers, and/or any other processing and/or communication device.

The terms device and untrusted device may be used herein to refer to a device for which additional security and/or levels of trust may be desired. For example, an untrusted device may be a device that, although possessing some security and/or authentication functions/procedures, may utilize one or more of the systems or methods described herein in order to achieve additional security or trust. COTS devices (e.g., cell phones, pagers, PCs, laptops, vehicles, kiosks, facilities, servers, workstations, tablets, smartphones, routers, modems, LANs, processors, controllers, microcontrollers, and/or any other processing and/or communication device) may be examples of untrusted devices.

For many applications that utilize high levels of security or assurance, there may be a lack of trust in the operation or state of a COTS device due to the wide range of cyber exploits that may be used to compromise one or more of applications running on the device, the operating system running on the device, and/or the physical hardware included in the device. In order to utilize COTS devices (e.g., devices that are associated with various levels of security) to process sensitive data in a secure manner, methods and systems are disclosed to increase the level of trust associated with a COTS device without altering the hardware of the COTS device. The methods and systems disclosed herein may be utilized to protect sensitive information/highly sensitive data (e.g., data classified as confidential or above) and/or other types of information such as personal data, medical data, data that is for official use only (FOUO), other sensitive (e.g., but unclassified) data, and/or any data or processing resources for which additional levels of security are desired.

For example, it may be useful to allow a COTS device such as a smartphone to be utilized to perform secure voice calls according to National Security Association (NSA) standards. Other examples of secure processing that may be performed in the presence of additional levels of security may include sending and/or receiving other types of secure communications (e.g., email, text messages, chats, other sensitive data transfer, etc.), reviewing/accessing/copying secure or sensitive data (e.g., display of secure documents on a tablet or other COTS device), modifying sensitive data, remote management applications (e.g., remote desktop applications), and/or the like. Although various techniques for achieving some additional level of security have been advanced (e.g., including one or more of the NSA Mobility Capability Package for Commercial Solutions for Classified (CSfC), Virtualization of the Operating System (OS) to provide insecure and/or secure containers, hardware roots of trust, etc.), such techniques may provide inadequate levels of security, may limit the functionality of the COTS device, and/or may lack flexibility for use with a wide variety of COTS devices.

As an example, Mobile Device Management (MDM) applications may be configured to validate the characteristics of a device to be secured. For example, the MDM may ensure that a particular radio is disabled, that user passwords are utilized, that the proper user is logged on, etc. An MDM application may enforce a wide range of policy, but the MDM may be limited to administration and validation functions that utilize services of the native OS. The high level checks performed by an MDM may thus be compromised by exploits within and/or hidden to the native OS, preventing the MDM to provide true validation of the security level of the device.

For example, a popular open source OS that operates on many COTS devices is the Android operating system. Historically, Android OS has exhibited many flaws and significant susceptibility to potential exploits. For example, the North Carolina State University (NCSU) Malware Genome project has identified over 1,260 attacks that have been performed against the Android OS. Additionally, various applications ranging from video players to document viewers that may run on OSs such as Android are also known attack surfaces that allow exploitation of the OS. Moreover, the attacks against these areas of susceptibility may change rapidly, making it difficult to prevent future attacks even after a previous attack has been identified. Flaws in the OS may allow compromise of the device such that it falsely reports the status of the device to the MDM. For example, the malware may have installed a root-kit that is capable of hiding the compromising malware from detailed inspection by knowledgeable users.

Trusted Platform Module (TPM) and/or Mobile TPM (MTPM) have been proposed by the Trusted Computing Group (TCG) to provide additional levels of security. TPM and/or MTPM devices may take the form of computer chips that may be embedded in computers and provide hardware resources for security services. The security protection of TPMs and/or MTPMs may be based on the premise that hardware services can be made to be much harder to subvert than software-provided services. TPMs and/or MTPMs typically provide services such as signature checking, cryptographic integrity checks, asymmetric public key generation from private/public keys, authentication credential checking, secure store key(s) for hard disk encryption, etc. The TPMs and/or MTPMs may also be part of a trusted boot process as described herein. While these features represent significant security services, TPMs and/or MTPMs may not assure that software running on the device is free of malware, which may provide a significant risk if sensitive data is processed on the device.

Trusted Boot is an example of an approach that may be used to review source code prior to instantiation of an OS. Trusted boot may prevent the loading of drivers and/or OS loaders that are not signed with an acceptable digital signature. For example, the source code may be reviewed by a trusted process and used to generate an executable binary image for the OS that cannot be changed except under certain controlled circumstances. The binary image may be validated prior to allowing the processor to operate using the image. In an example, the trusted boot verification process may utilize a trusted hardware component that prevents changes to the boot loader.

Moreover, prior to loading the binary image of the OS from a file that is stored in non-volatile memory, an authorization request and/or an integrity check may be performed on the OS files to ensure they have not been modified. For example, the boot loader may validate the OS being loaded using a signature check that validates the source of the image. An integrity check of the stored file may be utilized to ensure that the stored file has not been modified. If the authentication test and/or integrity check are passed, the trusted boot loader may instantiate and start the trusted image on the computer. The type of assurance utilized for operational security may vary depending on the application, but may include review of the source code implementing security related feature(s) and/or review of the complete OS.

However, trusted boot using a general purpose COTS OS may fail to result in the expected image being present in volatile memory, for example since the OS may include flaws that could allow the OS to be compromised after it is put into operation. For example, even if the file to be loaded passes signature and integrity checks, the operational image may later be infected with malware. Also, while the OS file(s) that are stored in non-volatile memory may be validated during a trusted boot, the operational image (e.g., the image that is present during operation of the operating system) may not be easily comparable to the boot file because one or more data structures and/or processes of the boot file may be stored in a different form than would be present during OS operation. For example, in the many boot processes, the OS file stored in non-volatile memory is not typically copied directly to dynamic memory by the boot loader. Instead, some programs are copied to dynamic memory and some (e.g., typically many) commands and/or scripts may be executed to create the dynamic memory image of the OS.

Therefore, since many types of COTS operating systems (e.g., Android OS, Linux OS, Apple iOS, Microsoft Windows OS, etc.) may be subject to numerous types of attacks that are difficult to prevent in advance, relying on a trusted boot process alone may still lead to data and/or resources being compromised. Trusted boot processes may also still allow for undetected compromise after the boot process is completed.

Rather than or in addition to trusted boot approaches, a dual boot approach may be utilized in order to increase the security of a computing platform. When utilizing dual boot, the user may select a certain disk partition and/or OS to initialize the computer. Thus, the user may be able to select the appropriate primitive boot loader (e.g., which may possibly be a part of the system Basic Input/Output System (BIOS)) that will instantiate on the dynamic/volatile memory of the computer and will become the OS of the computer.

During dual boot, a boot menu may be used that offers the user a selection of initialization options. Often, these multiple boot images or disk partitions have nothing to do with each other and are present because the user wishes to use different OSs for different purposes. For example, one OS may be used for performing word processing of documents while another OS may be used as a web server and/or for web page development. In an example, a trusted boot technique may be utilized as one option of the multiple boot-time options a user may select. However, even if trusted boot is used as an option during a dual boot approach, there may be an assumption that the user knows if a secure session is needed at the time of boot. By relying on a boot time decision to determine whether a trusted boot should be performed, it can be very difficult to integrate secure and non-secure functionality in order to increase overall usability. For example, at the time of boot, a user may not know whether or not a COTS phone will receive a request to perform a secure phone call that may implicate the use of increased security features. If either the increased security of a trusted boot or the instantiation of a native COTS OS is to be selected at the time of initial system boot, it may be difficult to integrate functionality that utilizes high levels of security with other personal computing activities such as playing games, performing navigation, browsing the Internet, etc. These personal applications may be associated with security requirements that differ, while boot-time selection may rely on the user to carefully and manually configure the device. Moreover, trusted boot approaches may not increase of operational security after boot, as the trusted boot monitor may be configured to simply monitor which boot partition was selected without providing operational security features during OS operation. Such a system may fail to detect threats that corrupt the device subsequent to the initial boot process.

In order to prevent malware installed on the native COTS OS from compromising functions that are require high levels of assurance or security, a computing device such as a COTS devices may be configured to implement a protected mode of operation. The protected mode of operation may be associated with an increased security and/or a limited set of functions for which monitoring and validation may be more easily achieved. For example, based on one or more triggers such as a request to utilize secure processing and/or perform a secure function, the COTS device may be configured to automatically and/or transparently replace the Operating System (OS) executing on the COTS device with different OS that may be referred to as a Secure OS. The Secure OS may be associated with a more limited functionality than the original OS.

For example, the Secure OS may operate utilizing a limited number of applications (e.g., may allow certain applications to execute but not others), may restrict memory access (e.g., restrict access to volatile memory), and/or may prevent access to certain types of hardware (e.g., such as radios or other communication devices). The Secure OS may monitor one or more applications and/or memory locations to ensure that the Secure OS and/or applications operating on the Secure OS are executing according to expected or desired behavior. The Secure OS may be configured to implement one or more methods for detecting malware or other malicious code within the Secure OS and/or other memory regions of the COTS device. While the Secure OS is in operation, the COTS device may be said to operate in Protected Mode.

In an example, the Secure OS may be a functionally reduced version of the native OS. For example, the native OS may be Android (e.g., or some other OS present on a smartphone), and the Secure OS may be a paired down or functionally reduced version of Android that eliminates or reduces one or more avenues for malicious attack. For example, the reduced version of the native OS utilized during protected mode operation may restrict access to physical resources such as the processor, periphery devices, memory locations, communication modules (e.g., radios, modems, etc.), and/or the like. The functionally reduced version of the native OS that is used as the Secure OS may include limitations on services offered during operation.

The secure OS may be a different OS than the native OS and may completely replace the native OS during operation in protected mode. In an example, the Secure OS may be owned, secured, and/or maintained by an administrator (e.g., specified company, government, entity, etc.). The Green Hills Integrity OS may be an example of a Secure OS.

Utilizing the Secure OS while in protected mode may increase the assurance and/or security of the COTS device in one or more ways. For example, by utilizing the Secure OS, the potential avenues for attack and/or introduction of malware may be limited. As an example, if the Secure OS provides fewer services than the native OS, it may be more difficult for malware to infect the Secure OS since there are fewer services for the malware to exploit. Programs such as media players, web browsers, networking services, etc. may be restricted or limited when the Secure OS is in operation in order to reduce the number of potential attack surfaces. By reducing the number of programs and/or executable that operate during the protected mode, the device by able to better ensure that the secure OS is not polluted based on the history and residual changes caused by insecure user activities.

For example, the native OS may be Android and the Secure OS may be a version of the Linux OS. The Linux OS may be simpler and may provide fewer system services than Android, thus limiting the avenues of attack. Examples of Android services that may be the object of a potential attack may include the Service Manager, the Dalvik virtual machine (VM), and/or the Binder, which may be utilized to provide inter-process communications. One or more (and/or other) of these Android modules may be stopped, restricted, and/or configured to operate in a privileged mode if a reduced version of Android is utilized for Secure OS operation in protected mode. In an example, the Secure OS may be a version of the Linux OS that does not utilize Android the Service Manager, the Dalvik VM, the Binder service, and/or one or more other Android services or modules that may be prone to attack.

The COTS device may be said to operate in an Unprotected Mode (e.g., with a relatively lower level of security than when operating in Protected Mode) when the native COTS OS (and/or some OS that is different than the Secure OS) is operational. During periods in which the device is operating in Unprotected Mode, the device may be operated without use of the Secure OS. Instead, the native COTS OS may be in operation and native and/or installed applications may be free to operate according to the policies of the native COTS OS. The security related functionality of a COTS device operating in Unprotected Mode may vary, for example depending on the type of COTS device, the use of the COTS device, the capabilities of the COTS device, the operation of the native COTS OS, the types of applications operating in the native COTS OS, etc. As may be appreciated, although operation utilizing the native COTS OS may be referred to as Unprotected Mode, the COTS device may still implement various forms of security and integrity during operation; however, the type and/or degree of security provided by the native COTS OS and/or applications running on the native COTS OS may be different than that provided by the Secure OS when operating in Protected Mode.

For example, when operating in the Unprotected Mode a user may desire to utilize functionality associated with a relatively higher level of security. For example, the user may select an application that is associated with an increased level security (e.g., a Secure voice call, establishing a secure communication session, transfer or processing of data deemed to be sensitive and/or secure). Upon receiving the request to utilize a secure application, the COTS device may automatically and/or transparently transition from the Unprotected Mode to the Protected Mode. The Protected Mode may operate the COTS device using a Secure OS.

Additionally, methods and systems described herein may be utilized to detect changes caused by malware. Systems and methods are described to prevent exposure of protected data while the device is operating in an Unprotected Mode. Systems and methods are described to protect unused or idle memory in the COTS device in order to prevent the unused or idle memory from being exploited by malware, for example during the transitions between Protected Mode and Unprotected Mode.

Transitioning to the protected mode may include changing from a full-featured OS (e.g., a native COTS OS) to a Secure OS. The Secure OS may implement additional security features as compared to the OS utilized during unprotected mode operation. FIG. 1 illustrates an example of transitioning from unprotected mode to protected mode and back to the unprotected mode. As an example, FIG. 1 may be described with respect to a COTS smartphone that executes the Android OS.

For example, at 102 the device may be configured to utilized the COTS OS while the device is in unprotected mode. The COTS OS may be the native OS of the device or some other installed OS. For example, the COTS OS or native OS may be a commercial version of Android that is executing on a Smartphone. During unprotected mode operation, the device may be running applications that were native to the COTS device and/or applications from third parties that were installed on the device. During unprotected mode operation, the device may utilize various drivers and/or peripheral hardware (e.g., communication modules such as radios and/or modems, user interfaces such as touchscreen displays and/or keyboards, other attached equipment, etc.). Applications may access hardware and other processing resources via the native OS. While operating in unprotected mode, the amount of security available to the user may be determined based on the relative level of trust in the native OS and/or the boot loader that instantiated the native OS and/or configuration of the device.

At 104, the device may determine to transition from unprotected mode to protected mode. For example, the user of the device may determine that a secure call is to be invoked. In an example, the user may select a Secure Call application and/or some other application that is associated with a heightened level of security. The Secure Call application or other application that is associated with a heightened level of security may be selected while the device is operating in unprotected mode and running the native COTS OS. Selection of various (e.g., one or more) applications running on the native OS may be a trigger to transition from unprotected mode to protected mode. The transition may occur while the native OS is in operation and may be performed without completely rebooting or shutting down the native OS. However, in some examples the transition may also be performed where the entire native OS is shut down.

Rather than, or in addition to, transitioning from unprotected mode to protected mode based on the selection of an application associated with a secure task, the transition from unprotected mode to protected mode may be based on implicit criteria. In other words, the device may be configured to determine to transition from unprotected mode to protected mode without receiving an explicit command or request from the user to perform such a transition or to invoke an application associated with protected mode operation. For example, the COTS device, while operating in unprotected mode, may receive a request to establish a secure call with another peer. The device may determine to transition to protected mode from unprotected mode based on the request. Other actions performed by the user of the device may cause the device to enter protected mode. For example, the user may request access to data that is deemed to be secure, may invoke an application that is associated with secure processing, and/or the like.

When transitioning from unprotected mode to protected mode, the native OS may be suspended by the device. For example, an application running on the native OS (e.g., the application that invoked the transition from unprotected mode to protected mode such as a "Go Secure" application and/or a secure call application) may hibernate the native (e.g., insecure) OS. For example, the application may copy the native OS operating image that was stored in Random Access Memory (RAM) to non-volatile memory such as flash memory and/or a hard disk. In another example, the native OS may be terminated and the operating image may be disregarded. However, by storing a copy of the image of the native OS in a file stored in non-volatile memory, the image can be used to reload the native OS when secure processing is complete and the device transitions back to unprotected mode from protected mode. Returning the native OS to its previous state from prior to the unprotected mode to protected mode transition may allow for a more robust and meaningful user experience, as the user would be permitted to return to previous insecure tasks after secure processing is complete.

At 106, once the image of the Secure OS has been loaded on the device, the device may operate in protected mode using the Secure OS. For example, the user may perform a secure call. While in protected mode, the device may perform one or more secure functions such as performing secure calls, sending electronic mail, utilizing remote desktop applications, and/or executing other applications for which heightened levels of security or assurance are desired.

At the end of the secure operation (e.g., a secure call is terminated), at 108 the device may be configured to transition from protected mode to unprotected mode. For example, prior to the Secure OS being terminated, the Secure OS may "wipe" the memory of the device to ensure that sensitive data is not exposed outside protected mode. Memory regions associated with protected memory operation may be cleared, zeroed, written to a predetermined pattern, written to a random or pseudo-random pattern, replaced with the data that was stored there prior to entering protected mode, and/or the like. In an example, the device may be returned to an initial state associated with the transition from unprotected mode to protected mode prior to exiting the protected mode. Returning to an initial protected mode state (or some other known state) may help ensure that secure or sensitive data that is operated on while in secure mode does not persist across the transition back to unprotected mode operation. The Secure OS may automatically restore the insecure image of the native OS (e.g., which may have been stored during the transition from unprotected mode to protected mode). Restoring the native OS such that the device returns to unprotected mode may be transparent to the user of the device. Once the sensitive data has been deleted, the memory region including the operating image may be cleared and/or replaced with the operating image of the native OS. In an example, the transitioning process may cleanse or erase some or all memory utilized by the Secure OS while in protected mode. At 110, the device may operate in unprotected mode using the restored image of the native OS, for example in a manner similar to that described at 102.

When operating in protected mode using the Secure OS, Secure OS control data may be configured to provide additional protection from malware. For example, many types of malware such as rootkits may hijack or otherwise manipulate control flows of the OS in order perpetrate an attack. For example, the malware may attempt to modify control data and/or hooks in the kernel space in order to compromise the OS. In order to combat such an attack, the Secure OS may be configured to consolidate control data associated with the Secure OS into protected memory space(s). For example, the Secure OS may prevent other processes other than the Secure OS from modifying the control data included in the protected memory space. The memory that stores the sensitive control data may be protected using techniques such executable space protection (e.g., a VMM, if used, marking of memory regions as non-executable, such that an attempt to execute machine code in these regions will cause an exception), and/or the like in order to prevent subversion while operating in protected mode.

The use of the Secure OS may form a layer of isolation between the unprotected mode and the protected modes. The isolation may be ensured by appropriately clearing and/or limiting memory access during mode transitions. Isolation of secure and insecure processing may be achieved by overwriting some or all memory not being used by the Secure OS, resident utilities utilized during protected mode, and/or applications utilized during protected with a specific data pattern. By overwriting unused memory with a specific pattern, additional protection may be achieved to prevent or mitigate the risk of attack by programs or malware that may utilize the unused memory locations.

In order to provide a controlled environment while operating in protected mode, one or more interfaces and/or subsystems of the untrusted COTS device may be restricted and/or disabled during operation in protected mode. For example one or more radio(s), processor core(s) (e.g., processing cores other than the primary core), electrical interfaces (e.g., USB, etc.), and/or the like may be disabled during protected mode operation.

Thus, by operating applications and/or processes that do not require high levels of security in a less-secure, unprotected mode (e.g., utilizing a native COTS OS) while automatically transitioning to a protected mode that utilizes a more secure OS to support higher levels of application and/or processing security, the capabilities and usability of COTS devices can be leveraged for everyday applications while still providing high levels of assurance when protected mode is entered. The transitioning between modes may be transparent to the user in order to provide a fluid user experience.

Transitions between protected mode and unprotected mode may be secured using various techniques. For example, the device may be configured to perform certain actions each time the device enters protected mode and/or each time the device exits protected mode. The actions may be designed to ensure each time a transition between protected mode and unprotected mode occurs that the entire device is brought to a known state. So state transitions may provide a level of isolation between the protected mode and the unprotected mode by ensuring that each mode begins operation from an expected state and data from a previous state is not maintained across a state transition.

For example, when a device transitions from unprotected mode to protected mode, the volatile memory (e.g., RAM) used to instantiate the OS may be restored to the known, predetermined binary image of the Secure OS to memory. By ensuring the volatile memory is restored to the expected binary image of the Secure OS, it may be asserted that the Secure OS does not include malicious malware and that the Secure OS will operate according to its expected functionality. In order to prevent malware from affecting protected mode operation, the Secure OS may be configured to generate and write a data pattern in some or all memory locations that are not occupied by the Secure OS and/or associated resident utilities or applications of the Secure OS. Writing the pattern to the unused volatile memory may be the first operation or task performed by the Secure OS, and such a pattern may be written prior to any other application being run in protected mode. In this manner, in addition to ensuring the binary image of the Secure OS is established to a known state upon transition to the protected mode, the remainder of the volatile memory that could be used as an attack path can be ensured to be set to an expected value. Such a transition may reduce or eliminate degradation of the secure state of protected mode operation by potential malware that may be present in the unprotected mode OS. By ensuring the Secure OS is loaded from a trusted binary image and writing a pattern to unused memory locations when entering the protected mode, the device can ensure that malware installed while operating in the unprotected mode is unable persist across the transition to protected mode.

After entering protected mode, the volatile memory of the device that is not used by the Secure OS may be used by applications to be run in protected mode. For example, one or more memory regions over which the pattern was written to memory may be used to execute one or more applications. The secure application(s) may be executed during operation in protected mode, and one or more trusted, non-resident applications operating in the memory unused by the OS may be used. Applications to be instantiated while the device is in protected mode may be validated (e.g., by the Secure OS) by authenticating a signature and/or validating integrity information (e.g., an integrity check) included with the application. One or more applications or utilities may be preinstalled and checked/validated with the Secure OS when entering and/or exiting protected mode. One or more other applications may be installed after entering protected mode, and such later installed applications may utilize authentication and/or integrity checks prior to execution.

In order to prevent modification of the Secure OS that may provide a potential avenue of attack, the Secure OS memory image may be maintained as constant or unchanged. Thus, each time the image is restored (e.g., when protected mode is entered), the Secure OS image may be the same as from previous times it was invoked. In order to ensure that the Secure OS image has not been modified, prior to restoring the image to RAM so that it can begin executing, the Secure OS image may be validated, for example by comparing an integrity checksum of current state (e.g., an integrity checksum performed across the volatile memory image) to a known or expected value of the integrity checksum. The integrity checksum may be a datum or data that is determined based on the contents of the data being validated. The integrity checksum may result in different output values for different bitstreams. Therefore, if the expected state of the device does not match the actual state upon validation, the result of the integrity checksum may be different than the expected result, meaning that the validation may fail. Examples of integrity checksums may include one or more of digests, hash functions, fingerprint functions, a cyclic redundancy check (CRC), a cryptographic hash function, and/or the like. If the validation is successful, operation in protected mode may be permitted to continue.

In an example, the Secure OS may be specifically configured to be validated to ensure that it has not been modified from its original distribution. Changes from the distribution version of the Secure OS may be indicators of infection of compromising malware and/or root kits. To prevent such an security compromise, the Secure OS may be configured in such a way that it is not modifiable by user operations while in either protected or unprotected mode, and the image that is loaded each time the device is transitioned into protected mode may be the same for each instantiation. This may be different than the typical techniques utilized to instantiate an OS, which may utilize one or more scripts or processes during OS loading that may modify the contents of the operational image of the OS. If such scripts are executed during OS instantiation, the memory image created may be slightly different each time the OS is loaded, making validation more difficult or more complex. By utilizing the same stored image of the Secure OS each time protected mode is entered—unlike the common, conventional OS loading— the operational image for the Secure OS may be the same each time it is instantiated. Portions of memory may be intermittently and/or periodically tested by the Secure OS to validate that applications are executing in their expected state and/or to ensure memory regions have not been compromised with unexpected data structures.

In example, the image of the Secure OS may be loaded on one or more devices operating in protected mode. For example, the same Secure OS image may be used on a plurality of devices of the same class. The Secure OS may be configured based on the class and/or capabilities of the device operating in protected mode. For example, the Secure OS may be customizable based on the original equipment manufacturer (OEM) vendor of the device, the hardware configuration of the device, the purpose or use of the device, and/or the like.

Figure 2:
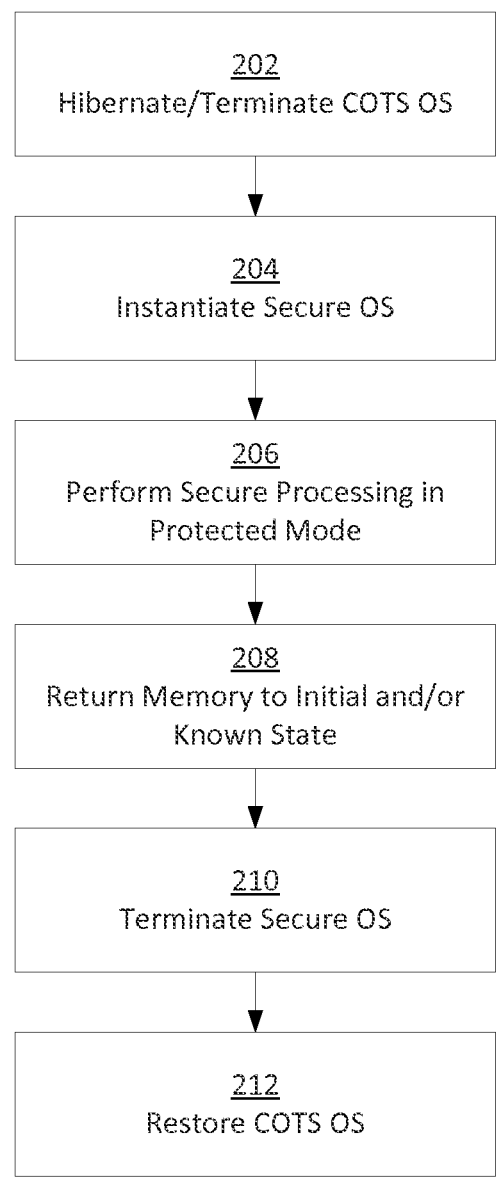
FIG. 2 is a flow chart illustrating an example method for transitioning a device between unprotected mode and protected mode.

FIG. 2 is a flow chart illustrating an example method for transitioning from unprotected mode to protected mode and back to unprotected mode. For example, at 202 upon determining to transition from unprotected mode to protected mode the device may hibernate (e.g., or otherwise suspend or terminate) the COTS OS (e.g., the OS that executes while the device is in unprotected mode). The termination of the COTS OS may be performed such that the unprotected mode session is not saved (e.g., the native OS is completely shutdown and/or the operating image of the native OS is deleted or disregarded). In an example, hibernation may be used in order to save information related to native OS operation for re-instantiation upon egress from protected mode. In the case many popular operating systems, hibernation may be utilized to preserve data of the unprotected session and may be invoked via the COTS OS. The operational volatile memory data and other data associated with the unprotected mode session and/or COTS OS may be written to a non-volatile storage device. Although hibernation may not be directly supported by the Android OS, hibernation may be achieved using the underlying Linux OS that forms the kernel for Android. Since applications intended for the Android OS are written such that they may be killed or terminated at any time, in some examples the unprotected mode session/OS may be terminated without storing state information or other data. In an example, the unprotected session including the COTS OS may be terminated and restarted upon egress from protected mode. Application(s) running in the COTS OS that are configured to transition the device to protected mode (e.g., a "Go Secure" app, a "Secure Voice Call" app, other apps that trigger security related functions or applications, etc.) may be configured to operate with system privileges that allow the application(s) to invoke or start the Secure OS.

At 204, the Secure OS may be started. In order to ensure that the Secure OS is loaded in a known or predictable state, the Secure OS image may be restored (e.g., the reverse operation to hibernation) using an image that was previously validated and/or authenticated. In an example, the Secure OS image may be started in the volatile memory from storage (e.g., a Boot or Kexec operation). For example, a Kexec operation may perform a system call that shuts down the kernel for the COTS OS and starts the kernel associated with the Secure OS. The Kexec operation may be similar to a reboot operation but may be independent of the COTS device firmware. Uboot may be an example of a boot loader that is embedded in Linux systems that be used to load the Secure OS. The image of the Secure OS may be created from a snapshot taken of the Secure OS as loaded for its intended configuration and/or may be created through a deterministic source code compiler. Examples of OSs that may be used as a basis for the Secure OS may include Windows (e.g., Windows in Safe-mode), Linux, and/or Green Hills Integrity. The specific OS chosen may be selected based on implementation specific security requirements.

The hardware and kernel for the Secure OS may be configured to minimize attack surfaces. For example, the Secure OS image may be configured such that Secure OS control data and/or Secure OS hooks may be aggregated or consolidated into a protected memory space. In an example, the Secure OS may be configured to control virtual memory by placing security-related and/or security-critical functions in protected Secure OS memory and/or some other secure physical memory location. The protected Secure OS memory may be a form of physical memory and may use physical memory addressing modes. A physical memory addressing mode may refer to a system of identification for memory that may be fixed based on the physical layout of the memory region and/or the hardware utilized to access the memory location. For example, a physical address (e.g., may also be referred to as a real address, binary address, etc.) may be a memory address that is represented in the form of a binary number on the address bus circuitry for physical hardware. The physical memory address may be used in order to enable the data bus to access a particular storage cell of main memory (e.g., RAM). Physical memory may refer to the actual memory locations used to store data within the hardware of the device, rather than virtualized locations generated and maintained by the operating system in order to simplify or abstract memory addressing for processes or tasks that are being executed. For example, physical memory may be assigned a non-modifiable (e.g., not modifiable in software) physical memory address that is not subject to change based on modifications of address translations by a VMM. Virtual memory blocks on the other hand, may be subject to addressing changes configured by the VMM. Using physical memory locations may allow for the data to be more easily protected and/or prevent unauthorized access to the data. Utilizing the protected kernel memory may result in routines that access the data to be compiled with the OS. However, some system utilities may be used to provide services and/or memory access to process without having the processes recompiled with the Secure OS.

In an example, the Secure OS may be configured to disable coprocessors and operate using only the primary processor. A single primary processor may be used even if the main volatile memory is not shared. In an example, the Secure OS may be configured to turn off and/or restrict access to video memory. In an example, the Secure OS may be configured to dismount non-volatile memory storage (e.g., flash, memory, etc.). The Secure OS may be configured to disable one or more input/output interfaces (e.g., Bluetooth, NFC, circuit-switched voice radios, etc.). These functions may be performed in order to limit potential avenues for malicious attacks against the Secure OS.

At 206, assuming the validation check was passed, the secure processing may be performed while the device is in protected mode. For example, secure operation to be performed may be a secure voice call, sending and/or receiving secure email, and/or some other data operation for which additional assurance or security is required. As an example, a secure voice over Internet protocol (SVoIP) phone call may be performed in protected mode. The SVoIP process may be performed using the Secure OS to access an enterprise server in order to connect users by IP address. The call itself may be configured using standard protocols such as RFC 3711 Secure Real-time Transport Protocol, RFC 3261 SIP: Session Initiation Protocol, and/or the like.

At 208, once secure processing tasks have been completed, the Secure OS may be returned to a known state prior to returning to unprotected mode. For example, any data not present during initial validation of the Secure OS image may be deleted and/or a pattern may be rewritten to unused volatile memory. The Secure OS image used may be unchanged from the image that was initially loaded. The pattern written to unused memory may be different than the initial pattern.

At 210, the Secure OS may be terminated. In an example, the Secure OS may be terminated using a privileged software utility that restarts the COTS OS. There may be no changes to the Secure OS from operating the secure session. At 212, the COTS OS may be restored based on the image that was written to non-volatile memory. The COTS OS maybe restarted using a restore operation (e.g., BIOS) and/or by writing into the volatile memory from storage (e.g., a UBoot or Kexec operation).

Upon egress from protected mode, the Secure OS may be configured to restore the unprotected mode OS and/or terminate itself (e.g., the Secure OS) without saving data and/or making changes to the Secure OS image. In an example, the Secure OS may be configured to remain in its initial state throughout the protected mode session. The Secure OS may be configured to return the volatile memory to a state similar to its initial state prior to exiting protected mode (e.g., although a new pattern may be written to unused memory, for example based on newly provided challenge parameters). Returning the volatile memory to a known state may prevent data generated during the protected mode session from being accidentally and/or purposefully exposed to the native OS associated with the unprotected mode. By returning the Secure OS to its initial state prior to exit of the protected mode, the device may be able to ensure that protected information from a secure session is not exposed in the unprotected mode.

In an example, the integrity of the protected mode (e.g., ensuring the secure OS is operating according to expectations) may be validated and monitored by a trusted means, for example a trusted monitor (TM) such as a reference monitor. A TM may be utilized to inspect the unused memory to ensure that the pattern is correctly stored. Examples of reference monitors such as external reference monitors (XRMs) and/or enterprise reference monitors (ERMs) are described in U.S. patent application Ser. No. 13/665,144, filed Oct. 31, 2012 and entitled "External Reference Monitor," the contents of which are hereby incorporated by reference in its entirety. The Secure OS may be configured to interact with a TM/reference monitor in order to validate that the Secure OS was properly instantiated (e.g., prevent unauthorized data and/or executable from the native COTS OS from persisting across the transition to Protected Mode), validate that the Secure OS operates correctly and/or according to expectations during the period in which the device operates in Protected Mode, and/or validate that the Secure OS is properly shut down (e.g., prevent unauthorized data and/or executable from the native COTS OS from persisting across the transition to Unprotected Mode). The results of the validation tests may be stored in an audit log of the TM that documents tests performed during protected mode operation and/or transitions to and/or from protected mode.

A copy of the Secure OS image may be provided to a TM for validation purposes (e.g., inspection during protected mode operation). For example, a single TM may monitor the operation of multiple devices operating in protected mode, for example via communications exchanged over a communication network and/or local or peer-to-peer communication channels. During operation in protected mode, the device may be configured to interact with a TM to ensure proper operation. For example, the TM may inspect the memory regions of the device that include the image of the Secure OS, memory regions associated with applications running on the Secure OS, and/or unused memory regions (e.g., unused RAM). By inspecting the volatile memory regions that may be operated on by the device during protected mode operation, the TM may ensure that malware or other malicious programs do not affect operation while the device is in protected mode. In an example, the Secure OS may be specifically configured to include applications utilized to detect malware and/or compromised software.

The methods and systems described herein may be utilized to supplement and/or replace a trusted boot process, for example if the instantiation of a secure OS is validated with remote attestation by a TM (e.g., XRM, ERM, IRM, etc.) at the time of secure processing. In this manner, the methods and systems described herein may be applied to a COTS computing device without the use of a hardware root of trust internal to the COTS device, while still providing stronger security guarantees to the user.

During protected mode operation, some or all used and/or unused memory may be written to a known pattern for a validation test. For example, a challenge/response validation test may be implemented using internal and/or external trusted monitors (e.g., a TM such as an XRM, IRM, ERM, etc.). In an example, validation may include determining a hash checksum of the binary image of the Secure OS that is operating in volatile memory (e.g., dynamic memory) after the Secure OS is restored to memory. The hash checksum may be compared to an expected result, for example as independently determined by the TM based on the expected state of the Secure OS. Such verification may detect possible subversion of the Secure OS utilized in protected mode by malware by detecting unauthorized changes to the binary image of the OS.

When used herein, the term image may refer to programs and/or other data that are stored in volatile memory (e.g., processor memory, program memory, dynamic memory, RAM, etc.). The term volatile memory may be used herein to refer to memory accessed by the processor in order to execute an operating system and/or one or more programs or executables on the device. Volatile memory may refer to and/or may be described as one or more of processor memory, program memory, dynamic memory, RAM, and/or the like. The term file may refer to programs and/or other data that is stored in non-volatile memory. An image may be created in volatile memory by copying a file from non-volatile memory to the volatile memory, by compiling file(s) and storing the results in volatile memory, and/or otherwise creating a binary image from a file stored in non-volatile memory.

Once the native OS image has been copied to non-volatile memory (or terminated), an operating image associated with the Secure OS may be instantiated on the device, for example using a restore operation or a boot operation. The primary difference between the restore and boot operations may be the source and/or type of non-volatile file used to load the Secure OS. For example, the Secure OS may be instantiated as a "Restore" of an operating image of the Secure OS that is stored in one or more files of non-volatile memory. For example, a restore file may be created by copying the OS image from volatile memory to a file stored in non-volatile memory. A restore may be made after the OS has been initially created through a boot operation. Use of a restore file may result in a more predictable operating image being loaded into non-volatile memory, for example if a boot processes results in a non-deterministic image being loaded into volatile memory. In a restore operation, the version of the Secure OS that is loaded on the device may be ensured to be an accurate replica of the binary image that is expected to be loaded, making inspection of the image after instantiation easier to perform. Thus, in an example a "restore" of the Secure OS may be performed to copy a binary image of the Secure OS directly to RAM upon transition to protected mode.

In another example, one or more files stored in non-volatile memory may be compiled from source code. Compiling source code to instantiate the OS may be referred to as a "boot" of the OS. The compiler may be configured to generate a deterministic result in order to ensure the final result of the booting process (e.g., the operational image of the Secure OS) is an accurate copy of the binary image expected by the TM. Such a boot may be different than a traditional boot process, which may rely on one or more non-deterministic techniques in order to create the operational image of the Secure OS. For example, in a non-deterministic boot procedure, the boot files may instantiate a kernel image, and the kernel image may retrieve and execute one or more files containing commands (e.g., the kernel may run one or more scripts or commands that can alter the final, operating image of the boot version of the Secure OS in a manner that can be difficult to predict in advance). A booted version of the Secure OS may still provide adequate levels determinism, for example if the boot file containing the kernel also contains the bulk of the OS and application code such that very few scripts may be used.

Many COTS OSs may not be deterministic, particularly during a boot process. As an example using a typical, non-deterministic boot process, a hashing analysis of the resulting OS can show that up to 75% (and beyond) of the memory image of the Linux OS may vary between two boots of the OS on the same device. Part of the non-deterministic nature of the boot process can be attributed to factors such as system services being started asynchronously by a scheduler, system resource locations being randomized by Address Space Layout Randomization (ASLR), the use of virtual memory (e.g., meaning that the current contents of device memory may be dependent on application execution history), and/or the like.

The non-deterministic nature of such processes may make it extremely difficult to detect unauthorized modifications to the OS by malware. Although some known malware may be detected using known signatures, such techniques may be less reliably used against sophisticated adversaries (e.g., nation states) and/or zero-day attacks. While transitioning to/from and/or operating in the protected mode, the Secure OS may be configured to prevent non-deterministic behavior, for example to allow the device to be brought to a known, verifiable state for entry and exit of the protected mode. Although restricting the Secure OS to operate in a deterministic manner may cause the device to provide a more limited functionality while operating in protected mode (e.g., the Secure OS may lack support full, generalized system services), by doing so the state of the Secure OS may be verifiable at all times during protected mode operation. Additionally, such limited functionality may be acceptable to the user, as unprotected mode may be utilized in order to support processes and services that may not be supportable in a deterministic protected mode.

By changing the identity of the OS when entering into protected mode, the Secure OS may be designed and configured in such a way so as to ensure that the binary operating image of the Secure OS may be very close to the originally provisioned image to a relatively high level of detail. In typical OS memory structures (e.g., during typical unprotected mode operation), the applications running on the system can change the OS state through various processes such as scheduling operations, swapping virtual memory pages, operating on stack data, utilizing wake locks, etc. Even when applications are idle, the system variations and/or residual variations within the OS may be large, leading to data structures that can vary greatly from their initial state and may be different each time the OS is executed even when similar tasks are being performed. For example, a process table may list processes in different orders based on the history of the system. Such differences may lead to changes of the operation image of the OS upon boot. Without isolating the OS utilized during protected mode operation from such effects, it may be difficult or near impossible to validate with certainty that the protected mode is operating securely. Therefore, the Secure OS may be operated in a deterministic manner to ensure consistent operation (e.g., perhaps with a more limited functionality than is utilized in unprotected mode). As a result of the Protected Mode's determinism, the external validation is highly effective at detecting changes.

The approach of provisioning a highly predictable OS that allows OS validation for entry and/or exit of the protected mode and monitoring of operation within the protected mode with an TM may increase the security of the system for performing secure functions while still providing a single device allowing the user to execute typical applications like web browsing and gaming. In addition to the Secure OS, one or more applications and/or processes may be inspected by the TM and/or the Secure OS itself during protected mode operation. In an example, the applications allowed to operate during protected mode may be deterministic in nature such that their state at any given moment in time may be predicted and validated by the Secure OS and/or by a TM. In an example, even non-deterministic programs may be utilized while in protected mode, although the non-deterministic software may be loaded and installed after the device has entered protected mode and the Secure OS instantiation has been verified. In this manner, even non-deterministic programs may be made more secure, as they may be subject to the control of the Secure OS, which would have been verified (e.g., and perhaps continually verified) to ensure expected operational states are maintained.

In general, memory may be identified as volatile or non-volatile. Non-volatile memory may often be the source of the OS (e.g., OS files are stored in non-volatile memory while the device is powered down), while volatile memory may be used for program and/or OS execution. During operation in protected mode, the Secure OS may be configured to prevent access to non-volatile memory regions. However, there may be one or more regions of volatile memory (e.g., dynamic memory, RAM, etc.) that may be unused (e.g., not occupied by the Secure OS and/or any preinstalled applications or utilities). During mode transitions (e.g., during validation that is performed during the transition to and/or the transition from protected mode), there may be one or more portions of volatile memory (e.g., RAM) that is not occupied by the Secure OS. These unused memory locations may be used by the Secure OS while in protected mode in order to execute Secure OS extensions and/or applications that are not part of the initial Secure OS verification process (e.g., programs that may be non-deterministic in nature and/or that were not verified with the Secure OS when entering the protected mode). In order to protect this unused memory from exploitation by malware (e.g., malware being imported from the unprotected mode, copying of protected mode data such that it is accessible in unprotected mode), a specified pattern may be written to the unused memory locations for the transitions to and/or from protected mode (e.g., and/or during protected mode operation). For example, unused memory that is not part of Secure OS validation could potentially be used to exfiltrate sensitive data utilized during operation in the protected mode to malware present while in unprotected mode. Described herein are systems and methods for generating a pattern in these unused memory locations such that if the pattern is not created in the unused memory during validation (e.g. and/or there is an attempt to spoof the validation step by hiding data structures in the memory), then the changes may be detected by the TM, for example based on the challenge response taking a longer time to prepare than is expected by the TM based on the requested challenge.

Figure 3:
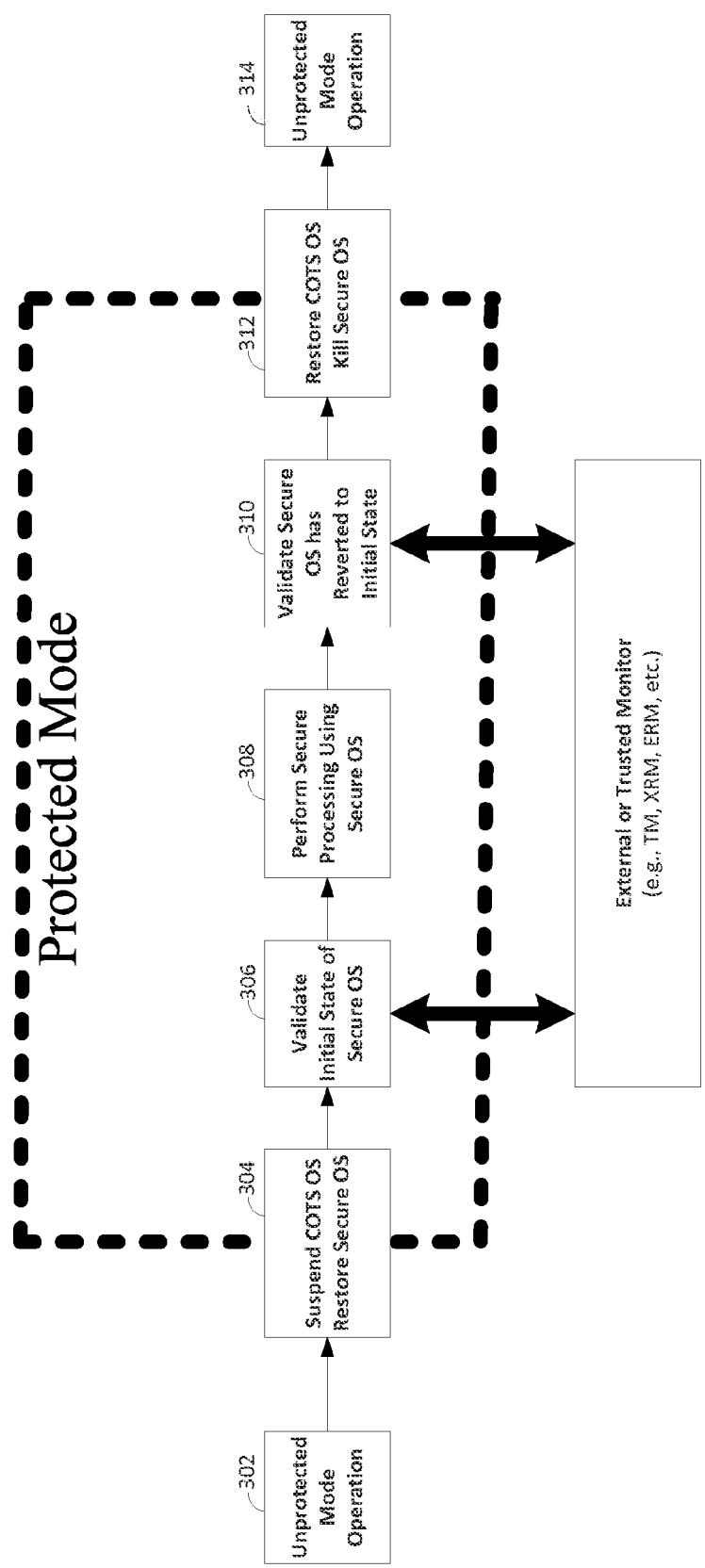
FIG. 3 illustrates an example for validating device during transitions to, operation in, and transitions from protected mode.

FIG. 3 illustrates an example of an external or trusted monitor being used to validate entry to and exit from protected mode. For example, at 302 the device may be operating in unprotected mode. While operating in unprotected mode, the device may determine to transition to protected mode. In order to perform the transition, at 304 the device may suspend the COTS OS and may restore a known, initial version of the Secure OS image into volatile memory. At 306, an external or trusted monitor may be used to validate that the initial version of the Secure OS was properly instantiated. Validation of the Secure OS may include one or more interactions with an external reference monitor (XRM), an enterprise reference monitor (ERM), and/or some other TM.

The trusted hardware component may be an XRM, which may be a trusted-hardware processing device that is local to the user, and/or an ERM, which may be a trusted-hardware processing device in communication with the untrusted device over a communication network (e.g., a server in an enterprise network setting). The TM may be an IRM, which may be internal to the device being monitored. The XRM and/or ERM may be used to provide validation that the Secure OS was properly installed to its expected initial state. The XRM and/or ERM may be configured to enforce the security policies associated with protected mode operation.

Once the initial install of the Secure OS has been validated by the external or trusted monitor, then at 308 the device may be performing securing processing using the secure OS (e.g., perform a secure voice call). Although not shown in FIG. 3, the external or trusted monitor may continue to test or validate the Secure OS and/or other device components while the device is performing secure processing in the protected mode.

At 310, the device may determine that it should transition back to unprotected mode and may return the volatile memory to a known state (e.g., its initial state, perhaps with a new pattern). The external or trusted monitor may perform a similar validation than was performed when the device entered protected mode. If the validation is successful, at 312 the Secure OS may be terminated and the previous COTS OS may be restored. At 314, the device may return to operation using unprotected mode.

Figure 4:
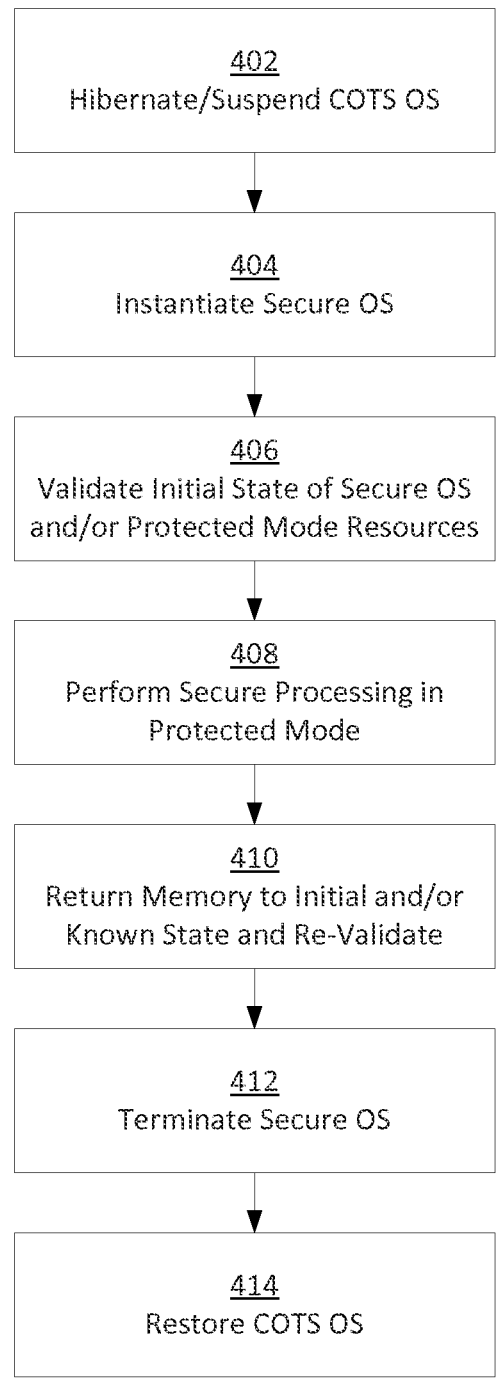
FIG. 4 is a flow chart illustrating an example method for transitioning a device between unprotected mode and protected mode where the device is validated by a TM.

FIG. 4 is a flow chart illustrating an example method for transitioning from unprotected mode to protected mode, validating the protected mode, and returning to unprotected mode. For example, at 402 upon determining to transition from unprotected mode to protected mode the device may hibernate or otherwise terminate the COTS OS (e.g., the OS that executes while the device is in unprotected mode). The termination of the COTS OS may be performed using hibernation in order to maintain the unsecure session for re-instantiation upon egress from protected mode. In the case of many popular operating systems, hibernation may be utilized to preserve data of the unprotected session and may be invoked via the COTS OS. The operational volatile memory data and other data associated with the unprotected mode session and/or COTS OS may be written to a non-volatile storage device. Although hibernation may not be directly supported by the Android OS, hibernation may be achieved using the underlying Linux OS that forms the basis for Android. Since applications intended for the Android OS are written such that they may be killed or terminated at any time, in some examples rather than hibernating the entire unprotected session, one or more applications may be terminated without storing state information or other data. In an example, the entire unprotected session including the COTS OS may be terminated and restarted upon egress from protected mode. Application(s) running in the COTS OS that are configured to transition the device to protected mode (e.g., a "Go Secure" app, a "Secure Voice Call" app, other apps that trigger security related functions or applications, etc.) may be configured to operate with system privileges that allow the application(s) to invoke or start the Secure OS.

At 404, the Secure OS may be started. In order to ensure that the Secure OS is loaded in a known or predictable state, the Secure OS image may be restored (e.g., the reverse operation to hibernation) using an image that was previously validated and/or authenticated. In an example, the Secure OS image may be started in the volatile memory from storage (e.g., a Boot or Kexec operation). For example, a Kexec operation may perform a system call that shuts down the kernel for the COTS OS and starts the kernel associated with the Secure OS. The Kexec operation may be similar to a reboot operation but may be independent of the COTS device firmware. Uboot may be an example of a boot loader that is embedded in Linux systems that be used to load the Secure OS. While loading the Secure OS using a boot operation may be utilized, additional security enhancements may be achieved when a memory image for the Secure OS is loaded from non-volatile storage and restored to system memory (e.g., RAM). For example, an OS may use scripts and other commands to start system services, which may result in undesirable changes to the OS image loaded into RAM. Thus, to ensure an expected image or configuration is loaded into volatile memory, a deterministic procedure may be used to load the same binary image of the Secure OS into volatile memory. The image of the Secure OS may be created from a snapshot taken of the Secure OS as loaded for its intended configuration and/or may be created through a deterministic source code compiler. Examples of OSs that may be used to create the Secure OS may include Windows (e.g., Windows in Safe-mode), Linux, and/or Green Hills Integrity. The specific OS chosen may be selected based on implementation specific security requirements.

The hardware and kernel for the Secure OS may be configured to minimize attack surfaces. For example, the Secure OS image may be configured such that kernel control data and/or kernel hooks may be aggregated or consolidated into a protected memory space. In an example, the Secure OS may be configured to control virtual memory by placing security-related and/or security-critical functions in protected kernel memory and/or some other secure physical memory location. The protected kernel memory may be a form of physical memory and may use physical memory addressing modes. Using physical memory locations may allow for the data to be more easily protected and/or prevent unauthorized access to the data. Utilizing the protected kernel memory may result in routines that access the data to be compiled with the OS. However, some system utilities may be used to provide services and/or memory access to process without having the processes recompiled with the Secure OS.

In an example, the Secure OS may be configured to disable coprocessors and operate using only the primary processor. A single primary processor may be used even if the main volatile memory is not shared. In an example, the Secure OS may be configured to turn off and/or restrict access to video memory. In an example, the Secure OS may be configured to dismount non-volatile memory storage (e.g., flash, etc.). The Secure OS may be configured to disable one or more input/output interfaces (e.g., Bluetooth, NFC, circuit-switched voice radios, etc.). These functions may be performed in order to limit potential avenues for malicious attacks against the Secure OS.

At 406, the initial state of the Secure OS and/or protected mode resources may be validated. For example, in order to perform the validation, the Secure OS may be loaded to a known state. Since validation of the OS may be difficult to perform due to differences in the operational memory state caused by run-time differences, the Secure OS may be configured (e.g., by performing one or more modifications to the source code of the Secure OS may prior to compiling the source code) in such a way so as to facilitate validation. For example, the Secure OS may be configured such that Address Space Layout Randomization (ASLR) is disabled. In an example, the Secure OS may be configured to utilize deterministic task scheduling techniques rather than non-deterministic task scheduling algorithms. For example, the Secure OS may instantiate itself without running any scripts.

After the Secure OS has been installed and the device is operating in protected mode, one or more of the following techniques may be utilized to facilitate the validation of the Secure OS. For example, a pattern may be applied to unused volatile memory to ensure the memory is in to a predictable state. For example, a one-time-pad and/or a random number supplied by an external and secure process may be applied to the unused dynamic memory. In an example, a hash or some other digest may be used to capture a digest of the volatile memory image of the device such that all dynamic memory is captured in a single validation function. A TM or other trusted external hardware may then be used to validate the Secure OS based on the captured image of the dynamic memory range. If the TM determines that the device as configured with the Secure OS is secure (e.g., the memory inspection results in the expected value(s)), the device may be authorized by the TM to access secure resources (e.g., the enterprise resources; resources for a secure voice call, etc.). If the validation check fails, the TM may reject and/or block requests to access secure resources, and the user may be informed of the failure. The TM may generate an audit log of the mode transition and/or OS validation events.

At 408, assuming the validation check was passed, the secure processing may be performed while the device is in protected mode. For example, secure operation to be performed may be a secure voice call, sending and/or receiving secure email, and/or some other data operation for which additional assurance or security is required. As an example, a secure voice over Internet protocol (SVoIP) phone call may be performed in protected mode. The SVoIP process may be performed using the Secure OS to access an enterprise server in order to connect users by IP address. The enterprise server may rely on the TM providing proper validation before authorizing the phone call. The call itself may be configured using standard protocols such as RFC 3711 Secure Real-time Transport Protocol, RFC 3261 SIP: Session Initiation Protocol, and/or the like.

At 410, once secure processing tasks have been completed, the Secure OS may be returned to a known state for validation prior to returning to unprotected mode. Such a validation may be similar to the validation that is performed upon entering protected mode. For example, any data not present during initial validation of the Secure OS image may be deleted and/or a pattern may be rewritten to unused volatile memory. The Secure OS image used for validation may be the same image that was initially loaded. The pattern written to unused memory may be different than the initial pattern. The TM may be used to perform the validation of the challenge response and may log whether the validation was successful or not.

At 412, the Secure OS may be terminated. In an example, the Secure OS may be terminated using a privileged software utility that restarts the COTS OS. There may be no changes to the Secure OS from operating the secure session. At 414, the COTS OS may be restored based on the image that was written to non-volatile memory. The COTS OS maybe restarted using a restore operation (e.g., a restore provided by BIOS) and/or by writing into the volatile memory from storage (e.g., a UBoot or Kexec operation).

Several techniques may be used by a TM in order to validate the Secure OS and/or the configuration of the device while operating in protected mode. For example, in order to perform the validation, the device being tested may be configured or otherwise brought to known state. For example, configuring the device in the known state may include setting hardware configuration registers too known values, specifying the condition of hardware resources, removing drivers for one or more interfaces and/or functions, setting the operating image residing in volatile memory (e.g., the Secure OS image, application memory, unused volatile memory, etc.) to a known state or set of value, and/or the like.

When configuring the volatile memory (e.g., RAM) to a known state, different techniques may be applied for inspecting different portions of the volatile memory. For example, when operating in protected mode, the volatile memory may include images corresponding to one or more of memory regions utilized by the Secure OS, memory regions utilized by applications resident in memory during protected mode (e.g., applications installed in the Secure OS), memory regions corresponding to data structures utilized by the Secure OS and/or in protected mode, unused memory regions, and/or the like. For example, there may be N bytes of unused volatile memory upon instantiation of the Secure OS and its corresponding resident applications and data. In order to perform validation, these unused volatile memory regions may be patterned according to a known techniques such that an integrity calculation may be utilized to ensure that malicious code is not hidden within the unused memory.

In order to perform the validation, the different memory regions may be brought to a known state that is configured such that a challenge/response test issued by the TM is difficult to spoof. For example, challenge/response tests may be designed such that it is extremely improbable that the challenge can be passed without the actual volatile memory being configured as expected by the TM. For example, writing a pattern such as "0xA5" to unused memory may bring the unused memory region to a known state (e.g., repeated pattern of 10100101), but such a scheme may be relatively easy to spoof without having to actually write the pattern to all of unused memory. Therefore, the pattern may be selected such that it is difficult to spoof the TM challenge.

Portions of the volatile memory that do not include part of the predetermined memory image (e.g., Secure OS image, application images, data, etc.) may be a relatively large portion of the volatile memory. For example, there may be enough unused volatile memory to store an entire, separate OS. In such a scenario, am unauthorized OS may attempt to execute in the unused memory regions and keep a copy of the secure OS in other memory regions in order to spoof a TM challenge that applied to the memory regions associated with the secure OS image (e.g., the unauthorized OS may keep as "window dressing" copy of the Secure OS in order to spoof TM challenges that require an image of the Secure OS to be stored in memory without actually executing the Secure OS). However, since the unused memory may be used by the Secure OS and/or applications operating during protected mode at some point during the protected mode session, attempts to restrict access to the memory may restrict the resources available to the Secure OS. Therefore, techniques are specified to occupy these unused memory portions during an initial and/or final memory validation but that allow the unused memory regions to be used by the Secure OS during protected mode operation.

One method for attempting to secure an unused memory region may be to write a non-repeating pattern to all of unused memory and include this pattern as "used" memory that is part of the Secure OS image (e.g., the pattern would be part of the OS provisioned to the device or given to the device as part of the challenge). For example, all of unused memory may be written with a random bit stream known to the TM. This approach may be used to occupy unused memory regions in volatile memory, but may provide less security because such a pattern may be easily spoofed by malware. Such a challenge may not provide an adequate test of the properties of the device. For example, using the simplified pattern approach may not assess a property of the device such that the assessment may be represented in the challenge response.

Figure 5:
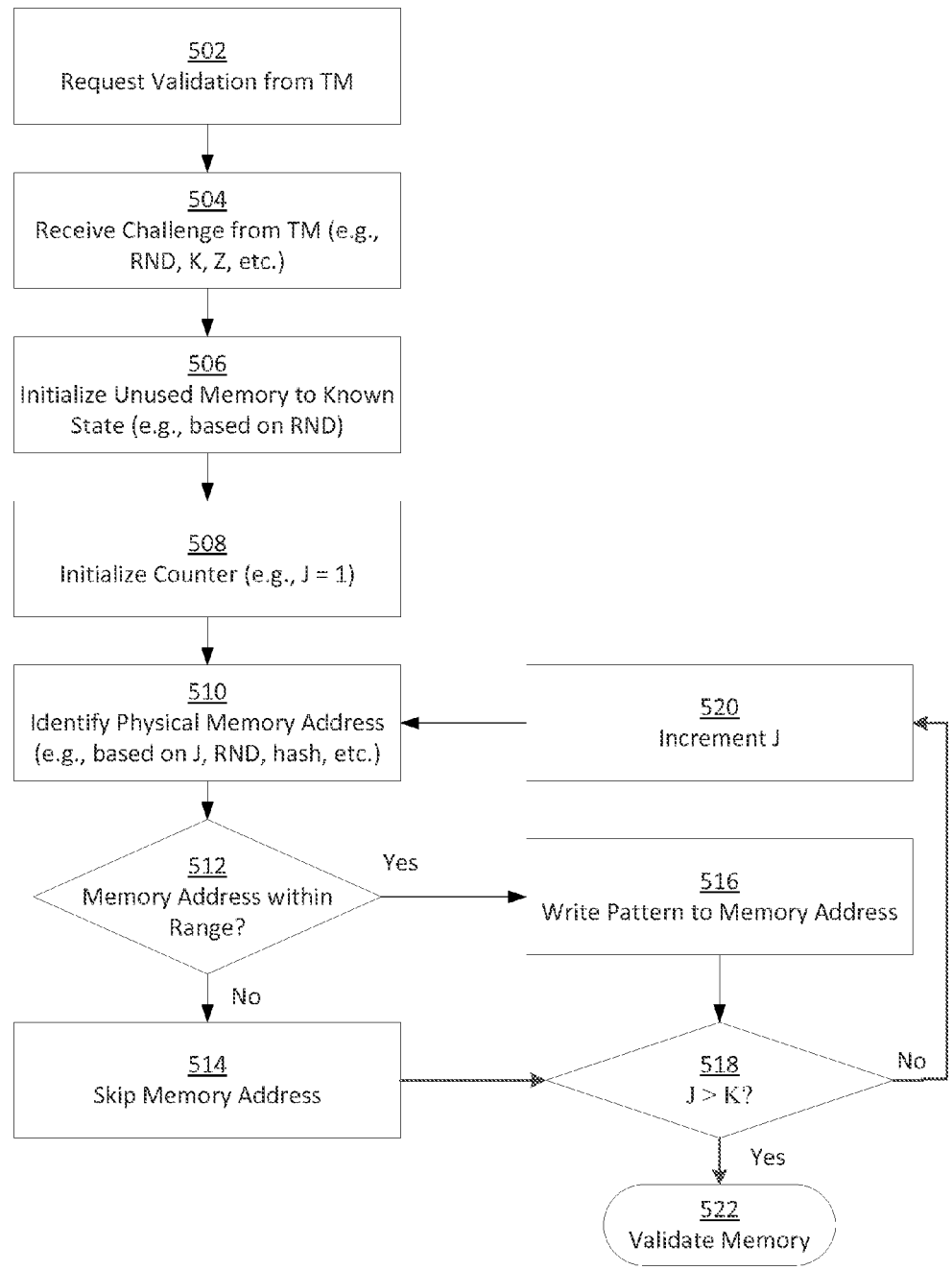
FIG. 5 is a flow chart illustrating an example method for bringing the volatile memory of a device to a known state for validation.

FIG. 5 is a flow chart illustrating an example method for securing unused memory regions in order to perform validation. The technique for validating the unused memory may be performed alone and/or in addition to validations of the Secure OS, the protected mode applications, protected mode data, etc. Although FIG. 5 may be described with respect to a TM validating the memory region to be performed, the validation procedure described herein may be used in other environments. For example, the validation described herein may be used as a confidence test and/or conformance test to ensure a memory region is configured properly. As an example, a device may configured according to a desired memory image and a validation test (e.g., digest of the memory region after configuration) may be performed to determine a validation result. The user or programmer may know the expected result of the validation (e.g., it may be provided with the software being validated), and if the validation result matches the expected response, the user may determine that the configuration has been correctly installed/instantiated on the device. Although validation may be described with respect to validation by a TM, validation results may also be provided directly to a user. For example, the COTS device may display a validation result to the user, and the user may compare to result presented to an expected response.

Further, although the validation procedure is described with respect to ensuring a device correctly transitioned into and/or out of protected mode, the validation technique may be utilized to ensure a device that operates according to a single mode or configuration. For example, a device to be validated may operate a single operating system using one or more applications, and the validation procedure (e.g., including writing a pattern to unused memory regions) may be used periodically and/or intermittently for a TM to determine that the device is still operating according to its expected configuration.

The validation procedure may be designed to bring some or all volatile memory regions into a known or expected state. The memory regions may then be used as a seed to a hash or some other polynomial function to derive a validation response. If the validation response provided by the device matches expected result as independently determined by a TM (e.g., and the response is received within an expected response time), the device may be considered successfully validated.

For example, a hash digest of the contents of some (e.g., certain specified regions) or all volatile memory regions to ensure that the Secure OS, the protected mode applications, protected mode data, and/or a pattern written to unused memory region(s) are configured in their expected state. For example, once the Secure OS is ready to perform a validation of the protected mode configuration of the device (e.g., at 406 and/or 410 in FIG. 4), at 502 the device may contact a TM in order to request challenge parameters to prepare the unused memory for validation. As noted above, the validation may be performed without the use of a TM, for example where the validation is being performed as part of a conformance test.

At 504, the TM may respond with a challenge. The challenge may include one or more challenge parameters. For example, the challenge parameters may include a random number (RND). The random number may be generated by the TM and may be used to initialize the pattern generator used to write the random pattern to the unused memory region. In an example, the random number may be 128 bits long, although other lengths may be used. The challenge parameters may also include a number of pattern generator cycles over which the pattern is written (K) (e.g., number of times the pattern may be applied to memory locations within the unused memory region). The variable representing number of pattern generator cycles over which the pattern is written (e.g., K) may be limit used by the device for a counter (J) as described herein. A larger value of K may result in a longer time for processing the validation request as more operations may be performed in order to determine the challenge response. The challenge parameters may also include an indication of the memory region to be tested. For example, a list of one or more memory address ranges (Z) may be sent to the device as part of the challenge. By varying the challenge parameters (e.g., the number of generator cycles (K), the indication of the memory regions to test (Z), etc.), the challenge and/or validation test may be tailored in order to take a specified amount of time to complete (e.g., based on the hardware capabilities of the device being tested). Therefore, the amount of time to complete the challenge may be a secondary check used by the TM (e.g., in addition to the actual challenge response/ digest value) to ensure that the validation is successful. In an example, a longer test may be used for the validations dues the transition to and/or from protected mode (e.g., to ensure the probability that the pattern binds each memory location is sufficiently high), while a shorter challenge may be used to test the device periodically and/or intermittently during protected mode operation (e.g., to ensure processes operating during protected mode are not starved of processing resources during an extended validation procedure). The pattern may be written to the unused memory prior to determining the challenge response. He value K may be chosen so that the pattern will be written a sufficient number of times that the probability of a memory address in the range Z will not be used for the pattern is low, provided that a random and/or pseudorandom memory location is selected for each pattern generator cycle.

In order to write the pattern to the unused memory region(s) based on the received challenge parameters, at 506 the device may initialize the unused volatile memory to an initial state based on the received random number (RND). The initial values may be set such that each individual memory region includes a random number with a roughly equal number of binary ones and zeros. It may be more difficult to spoof the challenge if the distribution of binary ones and zeros is close to equal. Additionally, in an example, each value may be different than each of the other values within the memory region.

For purposes of explanation, an example mathematical framework describing the operations used to write the pattern on unused memory is disclosed. For example, in the simplified memory region illustrated in FIG. 5, the volatile memory may include M memory locations, of which N memory locations may be unused. For purposes of description, the unused memory locations may be designated as locations 0 to N−1, while the Secure OS, one or more programs/utilities, and/or data may be stored at locations N to M−1. Such an arrangement is used to describe the pattern generation process, although in many scenarios the unused memory regions may be relatively mixed with used memory regions. Specific memory locations and/or address may be designated and/or referred to with the variable L, and the binary value stored at that memory address may be designated and/or referred to using the variable V. The set of memory values corresponding to memory location L may be represented as V[L], where V may be a vector of binary words indexed by L.

The unused memory may first be initialized prior to being patterned using several mathematical functions. For example, the initialization of the memory values V[L] for L={0 to N−1} may be performed in a variety of ways. One or more methods may be used in order to initialize each of the values in the unused memory region to a configuration that includes a relatively even distribution of binary ones and zeros. The initialization of unused memory may be configured to set the memory to a known state (e.g., a state known to the TM) that is non-trivial (e.g., a trivial initialization may be an all-zeros state that may result from "reset") and non-repeating. For example, the following initialization definition may be used:

$$\text{For } L=0, V[0]=RND \qquad \text{Equation (1)}$$

$$\text{For } L=\{1 \text{ to } N-1\} \; V[L]=L+RND \qquad \text{Equation (2)}$$

The technique utilized to initialize the unused memory region may also be known the TM.

Once the unused memory has been initialized to known values, then at 508 a counter J may be initialized (e.g., initialized to 1). A function that is based on the value of the counter J may be used to determine a memory address to use as part of the challenge. For example, there are many possible functions "f(J)" that may be used to determine the sequence of memory addresses to utilize for writing the pattern. For example, the function may be a unity function (e.g., use J directly). In this case, each of the unused memory regions may be processed in an incremental fashion (e.g., where L=f(J)=J). Another function f(J) that may be utilized may be a linear feedback state machine (e.g., a pseudorandom binary sequence (PRBS) generator). The linear feedback state machine may use its previous state value (e.g., the previous memory address f(J−1)) in order to determine the next value using a linear function such as an XOR. Other example functions f(J) may include encryption algorithm and/or encryption modes (e.g., counter mode (CM), cipher block chaining (CBC), etc.), and/or a hash function (e.g., cryptographic hash functions such as MD4, MD5, SHA-1, SHA-2, etc.).

Additionally, for each memory address L, a function may be used to write a new value to the address in order to complete the challenge. In order to prevent spoofing of the challenge, the order of operations on L that change V[L] may be randomized using a function that cannot be expressed in a closed form as a function of J, the independent variable. If the value V may be expressed as a closed form function of J (e.g., V(J)), then it may be relatively easy to spoof the challenge as the malware may be able to calculate appropriate values of the memory location without having stored the previous values of V at other memory locations.

Although many different types of non-closed form functions may be utilized to select memory address f(J) and/or write value V, a hash function will be described as an example. By using a hash function, the order of memory operations may become highly randomized. In this example, J may be assumed to be a linear counter that starts at 1. Note that f(1) may address any actual memory location as the starting location (e.g., f(1) need not correspond to the first memory location in the unused memory space).

The following processing sequence may be performed K times as shown in FIG. 5. For example, each memory location that is modified may be considered a pattern generator cycle, and/or each time the counter J is incremented may be considered a pattern generator cycle. At 510, J may be translated/transformed to a physical memory address, for example using a hash function. In an example, the number of significant binary digits of the counter J may be relatively small, for example 32 bits. In order to add entropy to the hash function, the value J may be extended by concatenating J with the random number (RND), for example where J may represent the least significant bits of the result. If the hash function is represented by the function f, then the hash result, f(J), may correspond to the memory region for which the new value will be written. The hash result f(J) may be segmented into a series of memory address values. For example, an example hash function SHA-1 may output a 160 bit result, while memory addresses may be comprised of few than 160 bits (e.g., 32 bits). Thus, for an example using SHA-1, each hash output string may be segmented into five physical memory addresses. For purposes of explanation and simplicity of description, all of the five addresses (e.g., either singularly or together) may be referred to generically as f(J).

Each candidate f(J) may be range filtered. For example, there may be many values of f(J) that do not correspond to any memory address within the unused memory region. If the unused memory region occupies N bytes of physical memory, then at 512 the device may determine whether the value of f(J) corresponds to a physical memory address within the N bytes. If the value does not fall in to the region of unused memory, then at 514 the value f(J) may be dropped and the next value of J may be checked. Since f(J) may represent a plurality of physical memory addresses, the addresses within f(J) may be taken in a specified order (e.g., first to last), one or more of the addresses may be disregarded, and/or some addresses may be disregarded (e.g., those falling outside the specified memory range), while others may be used. The same values (as explained below) may be written to each of the addresses within f(J) or each addresses within f(J) may be processed consecutively and may have different values written (e.g., based on the value J and the previously written value for a memory address).

When the range of L is relatively small as compared to an index represented by f(J), it may be beneficial to generate f(J) in ways that reduce the number of values that are found to be out of range at 512. As an example, if the range of L={0 to 100,000}, then most values of f(J) will be out of range. In the above example, f(J) was described as a binary 32 bit numbers, for example for use with common computer architectures/memory indexing schemes. Then, the upper limit of the range of f(J) may be approximately ~4.3×10$^9$, while approximately ~2×10$^{-5}$ of the values generated for f(J) are in the range of L. In such case, many suitable enhancements to the generation procedure may be utilized, including reducing the length of f(J) to roughly 17 bits or using the modulus math function, MOD. Such methods may be used to increase the efficiency at which memory addresses within the desired ranged are generated. For example, assuming an upper range for L=100,000, adding MOD function to the generator f(J) may result in:

$$f'=f(J)\text{MOD } 100{,}000 \qquad \text{Equation (3)}$$

Such a modulus scheme may ensure resulting values f' being within the posited range of L. However, in many practical scenarios, the unused memory regions and the occupied memory regions may be comingled within L, so even if a modulus or some similar operation is utilized, the memory region may still be checked to ensure that the determined value for f' corresponds to an unused memory location.

When f(J) addresses one of the N memory locations to be patterned, at 516 the memory locations corresponding to address f(J) may be written according to a function g, where g may be a function of J and V, where V may represent the value written to the memory location f(J)−1 (e.g., the memory location immediately preceding f(J)). However, the values of other memory locations other than the memory location immediately preceding f(J) may be utilized for the function g (e.g., memory location after f(J), a memory location a specified distance from f(J), a memory location that is a distance away based on J, etc.).

The function g may be used to modify the selected memory location f(J). The function g that may take the value of the preceding memory location (or some memory location with a specified relationship with respect to location f(J)) and the value of the counter J as an input. For example, the value stored in the previous memory location (e.g., V[f(J)−1]) may be combined with the value of the counter J to determine what value in the pattern should be stored at location f(J) (e.g., stored as the new V[f(J)]. In an example, the value stored in the previous memory location (e.g., V[f(J)−1]) may be XORed with the value of the counter J, for example as shown in Equation (4).

$$V[f(J)]=V[f(J)-1] \text{ XOR } J \qquad \text{Equation (4)}$$

Other functions that output a value based on the value stored in the previous memory location (e.g., and/or some other memory location within the pattern and/or volatile memory region) and a value of the counter J may be used (e.g., hash, polynomial function, binary function, etc.). In order to determine the next memory location to be modified in a relatively random (e.g., pseudorandom) manner, J may be incremented (e.g., at 520) and hashed, for example after being concatenated with the random number. In another example, after incrementing J, the new, incremented value of J may be concatenated with the identity/address of the previously modified address in the pattern and input into a hash function in order to determine a new memory location for the pattern. Once J and one or more other parameters have been input into the has function (e.g., J alone, J and the random number, J and the previous memory location, etc.), the result may be used in a manner similar to that for the previous value of J (see e.g. 510 above) to determine the next location to bind to the pattern.

In this manner, f(J) may cycle through the memory locations L in a pseudorandom order. The pseudorandom function may be selected to be a one-way function based on J, such that the result if the pseudorandom function cannot be used to determine what value of J was used to determine the result (e.g., if the result of the pseudorandom function is known (hash result) it is nearly impossible to determine what value of J resulted in the result that is known). In an example, the first memory address in the pattern may be selected based on the hash function result of the counter J with the random number (e.g., concatenating J with the random number). For each, pattern generator cycle, J may be incremented subsequently applied to the hash function (e.g., with or without concatenation of the random number), and the result may be used to selected the next appropriate memory location. When J is concatenated with the random number, J may represent the least significant bits for the seed to the pseudorandom (e.g., hash) function.

Once the pattern is g(V, J) has been written at memory location L=f(J) (e.g., based on the value associated with the address f(J)−1 and the value of counter J), then at 518, the device may determine whether J>K. If so, the pattern may be completed at 522, and the unused memory may be ready to be verified/validated. If not, at 520, J may be incremented and the next physical memory address location may be determined (e.g., f (J+1)). The sequence may be repeated until J>K. Once J>K, the device may determine that the volatile memory is in a form that is ready for validation with the TM. Therefore, at 522 the validation may be performed based on the memory contents after the pattern has been written to the unused memory. For example, the device may perform a digest or hash function over some or all of the memory range in order to validate one or more of the Secure OS, applications utilized in protected mode, protected mode data, and/or unused volatile memory (e.g., with a pattern written to the unused memory).

Figure 6:
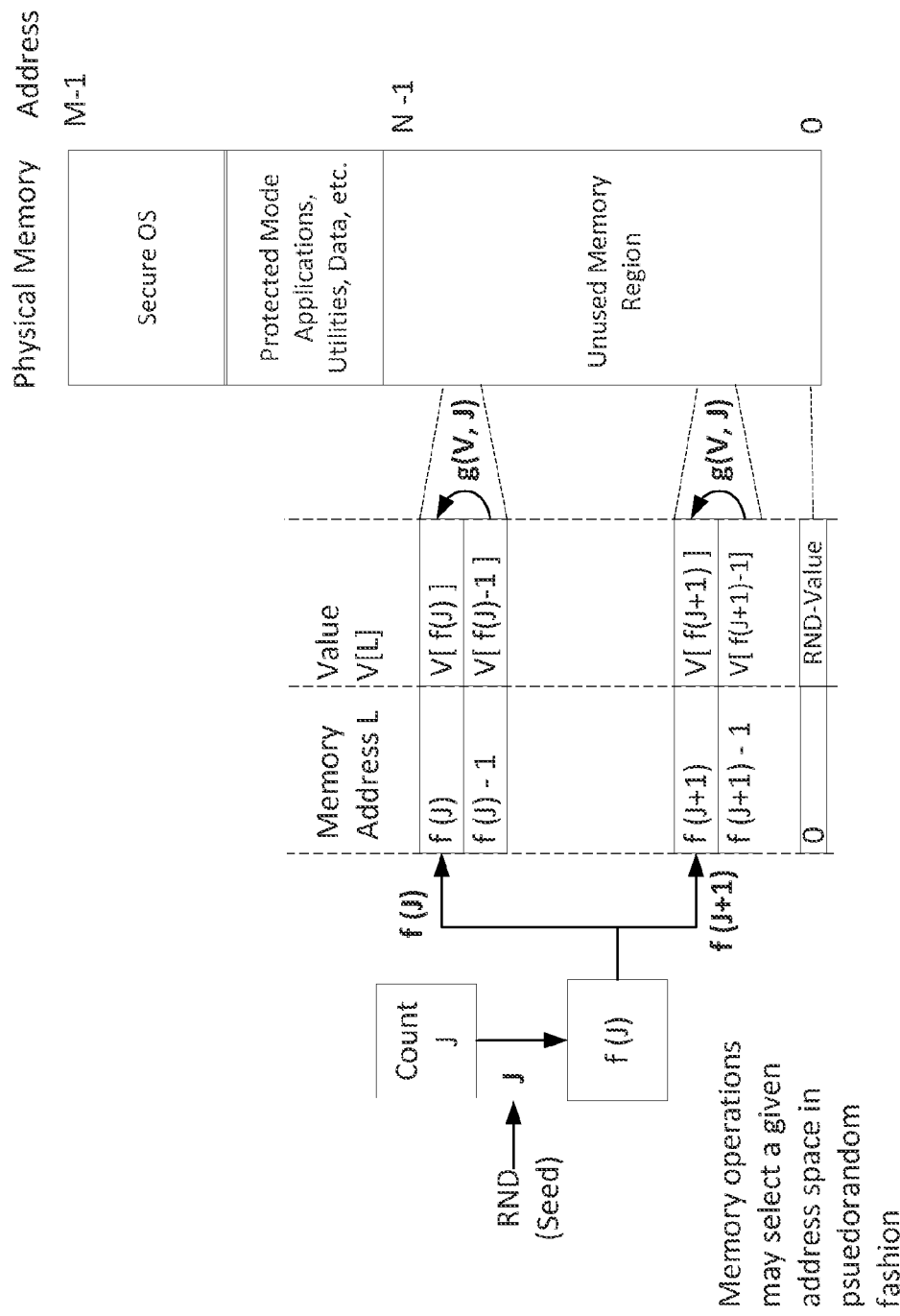
FIG. 6 illustrates an example of a memory region to be validated.

FIG. 6 illustrates an example memory region that may be patterned based on the example process flow described with respect to FIG. 5. As shown in FIG. 6, memory locations 0 to N−1 may represent the unused memory region, and memory locations N−1 to M−1 may represent the memory region utilized by the Secure OS, secure applications, secure utilities, sensitive data, etc. The addresses may be selected as a function of the counter J in the form f(J). The value stored at each address f(J) (e.g., represented by V[f(J)] in FIG. 6) may be a function of the value of counter J and the value associated with memory location immediately preceding it (e.g., in the case of location f(J), the value V[f(J)] may be determined based on the value J and the value V[f(J)−1] stored at memory location f(J)−1) although other memory locations other than or in addition to the preceding memory location may be utilized.

Once the pattern has been written to the unused memory locations, the entire volatile memory region may be inspected or validated using a challenge. For example, a digest of the entire volatile memory region (e.g., including the Secure OS image, application memory, sensitive data, unused memory including the written pattern, etc.) may be determined, for example based on a challenge vector Z. In an example, Z may specify or indicate that the entire memory region is to me included in the digest calculation (e.g., Z={0 to M−1}). For example, a hash may be performed starting with the memory location corresponding to byte M−1, and the hash may be continued by moving down the memory stack to a desired ending location, for example until the entire memory has been hashed. In an example, the hash may be performed until at least word N (e.g., the memory regions including the Secure OS and other protected mode data, but not the unused memory regions) as an atomic operation of a hash utility (a routine that executes to completion). If, for example, the unused memory were hashed first, malware may be able to potentially spoof the challenge as follows. First, the malware could perform the pattern function while resident between locations N and M−1. Then, after completing the hash of words 0 to N, Malware could move within are 0 to N and load the expected OS into memory region N to M−1 before completing the hash, thus spoofing the challenge in an undetected fashion. It is noted that the secure OS may be hashed after finishing writing the pattern to unused memory. If the hash of the OS is performed prior to writing the pattern, one or more of the pattern writing operations may alter the state of the OS in such a way so as the result of the hash of the OS after writing the pattern is different than the result of the hash prior to writing the pattern.

Writing a pattern to unused volatile memory may strongly enhance the security and isolation of the Secure OS and/or the protected mode. The Secure OS image may be relatively small compared to the size of the operating image of the COTS OS. For example, the Secure OS may occupy a very small portion of the volatile memory of the COTS device. As an example, a Secure OS and/or other resident secure executable/data may occupy less than 50 Mbytes of memory, which may be less than 5% of the available volatile memory on many typical COTS devices. Thus, the unused memory regions may provide a large attack surface for attempts to compromise the Secure OS and/or protected mode operation. By writing the pattern to unused memory, the memory regions included in the pattern made be bound to each other, making it extremely improbable that malware can successfully operate in the unused memory region. Instead, a malware attack may attempt to utilize memory in the region occupied by the Secure OS (e.g., region $L=\{M-1 \text{ to } N\}$) in order to propagate an attack. However, since the Secure OS may be of minimal functionality, overwriting any portion of the Secure OS may result in a high likelihood of functional failure of the device and/or detection by the user and/or TM. Further, in order to further decrease the likelihood of a compromise due to overwriting data within the Secure OS image, the size and/or functionality of the Secure OS may be reduce in order to increase the likelihood of changes to the operating image of the Secure OS leading to OS failure and/or being detected by the user.

The hash result of the memory scan may be sent to the TM for validation. In an example, the TM may perform a check of one or more of the result of the hash function as determined by the device and the amount of time it took the device to respond with the challenge answer in order to validate that the device is operating the in accordance with the expected configuration.

For example, the TM may measure the amount of time it take for the COTS device to send the challenge response after it has received the challenge parameters. Based on the TM's knowledge of the capabilities and configuration of the COTS device (e.g., memory size, processor speed, complexity of calculations, etc.), the TM may select a value for K such the COTS device processing to complete the challenge will take a significantly longer amount of time relative to the network message jitter. For example, the value of K may be selected in the range of 32,000,000 (e.g., generating>160,000,000 random addresses). Such a value may result in an expected response time in the range of 1 second using a typical COTS smartphone as an example, while network message jitter may be in the range of less than 0.02 seconds. In this manner, the TM may assume that the response time is almost entirely due to the calculation of the challenge response. The expected response time may be accurately determined based on the COTS device parameters and the challenge parameters. If the device does not respond within an expected response window, the TM may consider the challenge to have failed.

The TM may be configured to perform the challenge in a similar manner as the COTS OS. For example, the TM may block off a portion of TM memory, and use this memory portion to store an image of the Secure OS (e.g., the image to be restored and validated on the device), to store one or more applications, utilities, and/or data that are stored on the device volatile memory while in protected mode, and/or to write a similar memory pattern as is written in the unused memory region of the device. In essence, the TM may create a local copy of the expected binary memory image that is to be validated in the COTS device using the challenge parameters that were provided to the COTS device. The TM may determine a hash value for its copy of the COTS memory that it has created, and may compare the result to what it receives from the device. The TM may determine a response time (e.g., a response time window) when a successful challenge response is expected to be received, for example based on the mode of operation of the device, the processing capabilities (e.g., speed, capacity, etc.) of the device, the challenge parameters, and/or other information related to the capabilities of the device, If the results match, the TM may consider the validation successful (e.g., the TM may determine that each bit of volatile memory is configured to the expected state), while if the results differ, the TM may consider the validation to have failed. In an example, in order to conserve processing resources at the TM, rather than determining the challenge answer in near real-time using generated challenge parameters, one or more challenge answers may be precomputed based on their corresponding challenge parameters and stored at the TM. In this manner, the TM may not re-compute the challenge response for each issued challenge; instead relying on the precomputed challenge/responses that are securely stored on the TM.

Rather than, or in addition to, performing validation when the device is entering or exiting protected mode, one or more validation procedures may be performed in near real-time to monitor the Secure OS, other applications, and/or unused memory regions. Additionally, the TM may be configured to adjust the values supplied for K and/or Z in order to provide for quicker responses and/or increased levels of assuredness. For example, the proposed validation approach may be used to monitor a separation kernel for implementation of a virtual machine. The memory region Z may be specified to correspond to the separation kernel that implements the virtual machine.

In an example, during protected mode operation, periodic and/or intermittent validation may be performed to the Secure OS to ensure the Secure OS is operating according to expected procedures. For example, in order to inspect the Secure OS, Z may be set to correspond to the memory region $L=\{M-1 \text{ to } N\}$ and/or K may be set to a relatively small number, for example a number sufficient to cover most or all OS memory locations. For example, certain small, relatively unexploitable memory regions in the Secure OS image may be left out of the memory validation test. In this manner, the Secure OS may be validated while avoiding interrupting other operational capabilities. For example, such a validation of the Secure OS image may utilize few processor cycles, allowing sufficient processing capability for applications while performing the validation.

One or more applications that operate while the device is in protected mode may not be part of the protected mode entry/exit validation procedure. Such applications may be installed after the Secure OS has been instantiated and validated. In order to provide validation for these applications (e.g., memory inspection may be difficult, as the operating state may vary or be unknown), other techniques in addition to memory inspection may be used. For example, malware scans may be performed, signatures checks may be utilized, etc. In an example, applications that are not part of the memory inspection validation may be "white listed" and signed by a trusted source. The Secure OS may be configured to verify the signature based on the trust associated with the Secure OS before the application can be executed in protected mode.

The pattern that is written to the unused memory regions may be selected to have the property such that the contents of a given memory location may depend on the contents of some other physical memory location. Such a scheme may make it difficult to efficiently spoof the pattern without actually writing the pattern to a physical memory location. For example, by "binding" a given unused memory location to another unused memory location, each memory location (e.g., other than a seed location) for which the pattern is written may rely on a previous memory location to be used to store a prior result within the pattern and to be available for later calculation steps. If malware were to try to spoof the pattern without actually storing the pattern in physical memory as set forth in the challenge, significant overhead processing may result in addition to the processing time that would be associated with an uncompromised system. For example, the number of pattern generator cycles may be selected such that most or all memory locations are bound to the pattern, preventing the unused memory for being used for storage of malware. Thus, if the TM determines that the correct result is not returned within the predetermined threshold amount of time (e.g., the threshold may be based on the parameters of the COTS device such a processor speed, memory size, etc. and/or the challenge parameters), the TM may determine the validation to be unsuccessful.

In an example, the pattern to be utilized may be essentially unique for each challenge (e.g., based on the pseudorandom nature of how memory locations are selected), making the challenge response extremely difficult (e.g., if not essentially impossible) to be pre-calculated by a malware entity. Additionally, the number of processing steps required to generate the pattern and/or the number of processing steps required to determine the challenge response may be time adjustable, for example by varying the challenge parameters (e.g., RND, K, Z, etc.). In order to perform a two-pronged validation, challenge may be configured and/or issued by the TM such that the amount of processing time needed to write the pattern and perform the digest evaluation of the memory region may be relatively large as compared to any communication link delays (e.g., network jitter). In this manner, if the response is either incorrect or provided after a predefined response window has elapsed (e.g., the window may selected based on the device capabilities and challenge parameters), the TM may consider the validation to have failed. The device may be configured to perform the challenge using the highest priority in order to utilize the maximum number of processing resources in order to perform the challenge as quickly as possible. Thus, if the response is not received by the TM after the expected time it should take the device to perform the challenge, the TM may consider the validation failed. By configuring the challenge to take orders of magnitude longer than likely communication network delays, the TM may assume that the delay is due to the device processing the challenge. The response may be expected to be received within a response time window. For example, the window may begin at a time that is a predetermined time after the challenge was sent, where the predetermined time may correspond to a determined amount of time it should take the device to calculate a response. The window may end a given amount of time later, where the given amount of time may be set to correspond to a maximum acceptable amount of time for transmission delays (e.g., sending the challenge to the device, receiving a response, etc.).

In an example, the initial validation upon ingress to protected mode and the final validation upon egress from protected mode may be configured to be extremely robust challenges across the memory regions corresponding to the Secure OS, protected mode applications, utilities, data, etc., and/or unused memory regions written to a challenge pattern. Subsequent periodic and/or intermittent challenges while the device is operating in protected mode may be performed for certain memory regions (e.g., the Secure OS region) and/or may utilize a relative shorter pattern calculation time (and/or no pattern) for unused memory regions. The checks performed during protected mode operation may be designed to be performed in a more power-efficient manner than the initial checks (e.g., to save device resources) and/or may be designed to be shorter in order to use less processor time so that protected mode applications are not adversely affected/starved from processing resources.

The pattern may be designed such that the next memory location to select for writing the pattern may be chosen in a pseudorandom manner (e.g., based on an algorithm operation on the current value of a counter J and/or the current memory location). By writing the pattern into memory at pseudorandom location and utilizing a pattern where the value written into memory is dependent on the memory at some other location and the function of J (e.g., the sequence of operations is bound to the final pattern), the pattern may not be expressible in a closed form. This makes the validation determination (e.g., hash or digest), difficult to spoof without writing the actual pattern to physical memory locations. Moreover, the pseudorandom nature of the pattern may cause the sequence of operations to change for each challenge, preventing exploitation of the pattern generator.

The pattern may be generated with a "one-way" function to reduce or essentially eliminate the possibility of hiding a small group of memory locations (e.g., which may be installed with malware) and using brute-force calculation to attempt to spoof the TM for those few memory elements. For example, even attempting to hide four memory locations may be shown to result in a detectable performance variance in challenge response time in the majority of COTS devices.

For example, consider an attack where the malware occupies four words of memory, and attempts to spoof the challenge without writing the pattern to those four words of memory. In order to hide a memory locations, when the memory address pointer for the pattern (e.g., f(J)) identifies one of the four locations, rather than modifying the target memory location with the appropriate pattern value (e.g., such an operation would overwrite the malware), the malware may "filter out" the address values to be hidden and save its own data in those locations. It may then continue writing the pattern to other memory locations. Then, when the pattern is complete and it is time to perform the final hash/validation of the entire volatile memory regions, the malware would then need to calculate the pattern values that should be stored in the four locations (e.g., in sequence of descending addresses). If the malware does not determine these values, then the hash check may fail.

Given the function utilized to select the patterned memory addresses (e.g., f(J)) is not reversible, the a malware would attempt to find the value(s) of J that corresponds to the four hidden addresses by stepping from J=1 to P, where f(P) corresponds to at least one of the malware infested addresses. Then, the pattern value that should be stored in memory would be calculated based on P and the value stored at the previous memory address (e.g., as V[f(P)−1] and P) and fed into the memory hash calculation. In order to perform such a determination, on average the malware would operate N/2 calculations of f(J) for each hidden memory word. Therefore, the malware may utilize 2N calculations/processing steps in order to hide four words. Since N may represent the number of memory locations to be validated, it could take the malware approximately twice as many calculations to hide the four memory location as it would take the device to calculate the hash of the entire memory space N. Thus, such a time difference may be utilized by the TM to detect a spoof. Since the determination of the f(J) may be processor-intensive, for many scenarios doubling N essentially triples the challenge response time. While four hidden words is used as an example, even a single hidden word can be detected in many applications because the intended challenge response time can be scaled to exceed system timing variations. Additionally, increasing the amount of time it takes to successfully perform the challenge may establish a strong isolation between the unprotected mode and the protected mode (e.g., data cannot leak between modes due to malware and/or software defects).

Moreover, such a determination that is utilized to estimate the time needed to spoof the pattern may serve as a lower limit on the amount of time needed to spoof the pattern, but other factors may also increase the response time. For example, the above estimate of spoof time assumed that the value stored at the preceding memory location to f(P) (e.g., V[f(P)−1]) was known at the instant when V[f(P)] is to be determined. In most practical scenarios, the history of each location may be quite complex and various memory locations may be overwritten several times, for example where K>>N. Moreover, each time a memory location is written to the pattern, the value to be written may depend on the current value of J, which changes over time/course of the pattern. Thus, the malware may attempt to utilize a lookup table of J as a function of f(X), which would contain K entries. Notionally, this lookup table may be bigger than the size of the memory to be patterned resulting in additional computational difficulties that may make spoofing the challenge extremely difficult. Moreover, even given a look-up table, the determination of the appropriate value to store at f(P) (e.g., V[f(P)]) may be unable to be expressed in closed form, making spoofing the calculation computationally intensive.

Thus, in order to ensure that the unused memory is brought to a known state in order to complete the challenge (e.g., in order to prevent unused memory from being a means to exfiltrate protected data and/or to hide malware), a pattern may be selected such that the memory locations for the pattern may be selected in a pseudorandom fashion and the values written to the memory locations may depend on the value of another memory location in the pattern and the order in the pattern for this operation (e.g., the value of the counter J). Such a pattern may make it extremely difficult or practically impossible to identify an appropriate value to write in a memory location within a specified response window without writing the pattern in the specified order. The pattern is "bound" to the memory such that each value written during pattern generation may depend on the value written to another memory location and the order of the given operation within the pattern.

As was noted earlier, to increase performance (e.g., reduce pattern writing time) multiple memory address values may be derived from each value of f(J). Such a technique may utilize the same value of J for each of the memory locations derived from f(J) and/or may utilize a sub-counter in addition to J that may be utilized to provide differential count values within each memory location f(J) (e.g., the counter J and the sub-counter may be utilized as an input for determining the appropriate value to write to the memory location and/or to select the next memory location).

Although the term COTS device is utilized herein to describe a computing device to be validated, any computing device for which additional levels of assurance or additional levels of security are desired may utilize the techniques described herein. COTS devices may also be referred to as untrusted devices.

As noted above, the TM may be a trusted hardware component that is utilized to validate the COTS device. Examples of TMs may include internal reference monitors (IRMs), XRMs and/or ERMs. For example, an IRM may be hosted by the device to be monitored. The IRM may be a hardware component internal to the device being monitored. In this manner, the device may execute a given operating system and the IRM may be configured to ensure that the device utilizes an expected image of the operating system and/or has correctly written a pattern to the volatile memory that is not used for storing the operating system.

For example, an IRM may be an example of a TM that is used to validate that the memory of the device that includes the IRM. For example, a device may be configured to execute an operating system. The device may include memory configured to store an operational image of the operating system. The memory may also store a pattern that is written to at least a portion of the memory that is not occupied by the operational image of the operating system. The device may include an internal reference monitor (IRM). The IRM may be configured to validate that the memory is configured with the correct operational image of the operating system and the pattern. For example, at least one memory address used for the pattern may be selected based on a result of a pseudorandom function. A value of a counter initialized at the beginning of the pattern may be an input to the pseudorandom function. A value written to the at least one memory address may be determined based on a value that was stored at another memory address in the memory and the value of the counter used as the input to the pseudorandom function (e.g., the order in which the memory address is written in the pattern may affect the value written to the memory address). As an example, the pseudorandom function may comprise a hash function.

Figure 7:
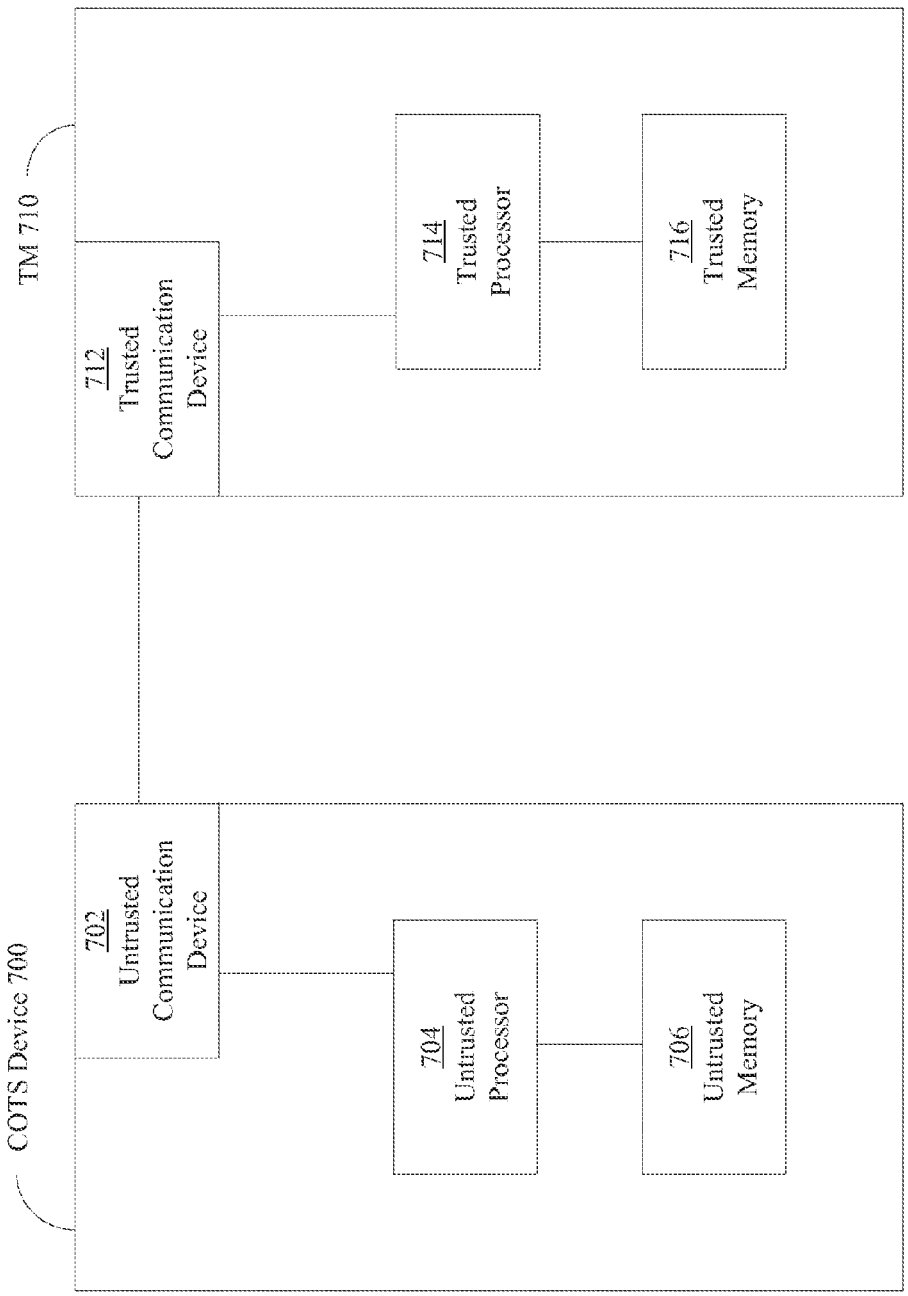
FIG. 7 illustrates an example architecture including a COTS device and a TM.

FIG. 7 is an example system diagram of a COTS device (e.g., an untrusted device) device and a TM (e.g., an XRM). In the example illustrated in FIG. 7, both COTS Device 700 and TM 710 may be local to the user. For example, COTS Device 700 may be a smartphone and TM 710 may be a token that is local to (e.g., in the same location as) the user. COTS Device 700 may be any device for which additional security is desired, for example a smartphone device. For a variety of reasons, a user of COTS Device 700 may be unable to verify that COTS Device 700 meets a desired set of security requirements. For example, a security status of COTS Device 700 may be unknown to the user. In another example, COTS Device 700 may be associated with a certain level of security, and TM 710 may provide an additional layer of security, for example in order to meet the desired set of security requirements.

COTS Device 700 may include Untrusted Processor 704 and/or Untrusted Memory 706. Untrusted Memory 706 may be a tangible, computer-readable medium configured to store data and/or computer executable instructions. Untrusted Processor 704 may be configured to execute the computer executable instructions stored on Untrusted Memory 706. Untrusted Memory 706 may include volatile memory (e.g., volatile memory such as RAM) and/or non-volatile memory (e.g., Flash memory, a hard drive, etc.). Untrusted Processor 704 may be configured to perform one or more functions such as a security function. For example, Untrusted Processor 704 may perform authentication and/or encryption/decryption. COTS Device 700 may include Untrusted Communication Device 702 (e.g., an untrusted transceiver or other communication means). In an example, one or more hardware modules included in COTS Device 700 may be unsecure and/or the security status of the module may be unknown. For example, one or more of Untrusted Communication Device 702, Untrusted Processor 704, and/or Untrusted Memory 706 may be considered untrusted because the user of COTS Device 700 may be unable to verify that the security level associated with the hardware of COTS Device 700 is able to meet the desired security level for the user for a given task. An example of unsecure hardware may be hardware that was manufactured outside of a designated high-assurance environment. For example, a Type 1 product may be a device or system certified by the NSA for use in cryptographically securing classified U.S. Government information. If a device is manufactured in a non-NSA certified facility, the device may be considered unsecure and/or may not be a Type 1 product. TM 710 may be configured to provide security functionality (e.g., similar to a Type 1 certified device) for an untrusted platform.

Untrusted Communication Device 702 may be configured to communicate with Trusted Communication Device 712 of TM 710. For example, Untrusted Communication Device 702 may communicate with Trusted Communication Device 712 via Bluetooth, Near Field Communications (NFC), Wi-Fi, Ethernet, using IP protocols, via a communication network, using wireless signals, using a direct physical connection, and/or the like.

TM 710 may include Trusted Processor 714 and/or Trusted Memory 716. Trusted Memory 716 may be a tangible, computer-readable medium configured to store data and/or computer executable instructions. Trusted Processor 714 may be configured to execute the computer executable instructions stored on Trusted Memory 716. Trusted Processor 714 may be configured to provide security assurance for Untrusted Device 702. For example, TM 710 may communicate with COTS Device 700 via Trusted Communication Device 712 in order to monitor functions being executed by Untrusted Processor 704. In an example, TM 710 may provide a type of security challenge to COTS Device 700. TM 710 may determine a security status of COTS Device 700 based on a response to the security challenge provided by COTS Device 700.

TM 710 may be implemented in a variety of hardware devices. For example, TM 710 may be implemented in an external module that is coupled to COTS Device 700 (e.g., a micro-Secure Digital (SD) card, a subscriber identity module (SIM) card, a module such as flash memory coupled to COTS Device 700 using interface such as universal serial bus (USB), etc.). TM 710 may be a small, lower power device that functionally independent of COTS Device 700, but that is in operable communication with COTS Device 700.

TM 710 may be utilized to perform one or more security functions on behalf of COTS Device 700. For example, one or more of the NSA's Information Assurance Requirements Directive (IASRD) security requirements may be met by TM 710 on behalf of COTS Device 700. Example security functions that may be performed by TM 710 may include memory management, determining and/or verifying checksums, determining and/or verifying cyclic redundancy checks (CRCs), determining and/or verifying integrity check values (ICVs) data labeling, sequence monitoring, etc. Additionally, it may be possible to transfer security functions from COTS Device 700 to TM 710, for example to assist with meeting fail-safe requirements (e.g., preventing tampering, prevent unauthorized events, control access to control keys, etc.).

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions described herein.

What is claimed:

1. A method for validating volatile memory, the method comprising:
   determining a plurality of challenge parameters, wherein the plurality of challenge parameters are associated with a challenge that is intended to bring volatile memory to a known state for validation, and the plurality of challenge parameters comprise an indication of a memory region and a random number;
   writing a pattern to at least one portion of unused volatile memory of the volatile memory, wherein writing the pattern to the at least one portion of unused volatile memory comprises:
      initializing a counter,
      selecting at least one memory address on which the pattern is written based on a result of a pseudorandom function that takes a current value of the counter as an input,
      determining a value to write at the at least one memory address based on a value that was stored at another memory address in the volatile memory and the current value of the counter that was used as the input to the pseudorandom function, and
      writing the value at the at least one memory address;
   determining that the volatile memory is ready for validation in accordance with the challenge; and
   performing a validation procedure on the volatile memory.

2. The method as in claim 1, wherein the challenge parameters further comprise a number of pattern generator cycles over which to apply the pattern to selected memory addresses.

3. The method as in claim 1, wherein:
   performing the validation procedure comprises performing an integrity checksum across the volatile memory, and
   a result of the integrity checksum is transmitted to a trusted monitor (TM).

4. The method as in claim 1, wherein the validation procedure is performed over at least memory values corresponding to at least a portion of an operational image of an operating system and across the at least one portion of unused volatile memory.

5. The method as in claim 1, wherein the another memory address comprises an adjacent memory address to the at least one memory address.

6. The method as in claim 1, wherein the result of the pseudorandom function is utilized to select the at least one memory address by translating the result of the pseudorandom function to the at least one memory using a modulus operation.

7. The method as in claim 1, wherein a first memory address in the pattern is selected based on a result of a hash function being applied to the counter and the random number.

8. The method as in claim 7, wherein writing the pattern to the at least one portion of unused volatile memory further comprises:
incrementing the counter to a new counter value after writing the value at the at least one memory address;
selecting a second memory address on which the pattern is written based on a result of a pseudorandom function that takes the new counter value as an input;
determining a second value to write at the second memory address based on a value that was stored at a memory address that precedes the second memory address in the volatile memory and the new counter value that was used as the input to the pseudorandom function; and
writing the second value at the second memory address.

9. The method as in claim 1, further comprising initializing the at least one portion of unused volatile memory prior to writing the pattern to the unused volatile memory, wherein the at least one portion of unused volatile memory is initialized based on the random number.

10. The method as in claim 9, wherein initialing the at least one portion of unused volatile memory based on the random number comprises:
storing the random number at a first determined memory address of the unused volatile memory;
incrementing the random number;
storing the incremented random number at a next determined memory location; and
repeating the incrementing of the random number and storing each iteration at a subsequent memory address until the at least one portion of unused volatile memory has been initialized.

11. A device comprising:
memory configured to store an operational image of the operating system and a pattern that is written to at least a portion of the memory that is not occupied by the operational image of the operating system; and
a reference monitor comprising a processor configured to validate that the memory is configured according to an expected configuration of the operational image of the operating system and the pattern, wherein the expected configuration is associated with a challenge, and the processor is configured to determine the pattern written to the at least one portion of unused volatile memory by being configured to:
initialize a counter,
select at least one memory address on which the pattern is written based on a result of a pseudorandom function that takes a current value of the counter as an input,
determine a value written to the at least one memory address based on a value that was stored at another memory address in the memory and the current value of the counter that was used as the input to the pseudorandom function, and
write the value to the at least one memory address; and
the processor of the reference monitor further configured to:
determine that the memory is ready for validation in accordance with the challenge associated with the expected configuration, and
perform a validation procedure on the memory.

12. The device as in claim 11, wherein the pseudorandom function comprises a hash function.

13. The device as in claim 11, wherein the device further comprises at least a transceiver configured to receive an indication of challenge parameters, and the challenge parameters comprise a memory region, a random number, and a number of pattern generator cycles over which to apply a generated pattern to selected memory addresses.

14. The device as in claim 13, wherein a first memory address in the pattern is dependent on the random number.

15. The device as in claim 13, wherein the processor is configured to initialize at least the portion of the memory that is not occupied by the operational image of the operating system prior to validating that the memory is configured according to the expected configuration of the operational image of the operating system and the pattern by being configured to:
store the random number at a first determined memory address of the portion of the memory that is not occupied by the operational image of the operating system;
increment the random number;
store the incremented random number at a next determined memory location; and
repeat the incrementing of the random number and storing each iteration at a subsequent memory address for the indicated number of pattern generator cycles.

16. The device as in claim 11, wherein the another memory address comprises an adjacent memory address to the at least one memory address.

17. The device as in claim 11, wherein the processor is configured to utilize the result of the pseudorandom function to select the at least one memory address by translating the result of the pseudorandom function to the at least one memory using a modulus operation.

18. A trusted monitor (TM) for validating that volatile memory of a device is configured in a known state, the TM comprising:
a transceiver configured to send a plurality of challenge parameters to the device, wherein the plurality of challenge parameters are associated with a challenge issued to the device, and the plurality of challenge parameters comprise an indication of a memory region and a random number;
a processor configured to write a pattern to at least one portion of volatile memory, wherein writing the pattern to the at least one portion of volatile memory comprises:
initializing a counter,
selecting at least one memory address on which the pattern is written based on a result of a pseudorandom function that takes a current value of the counter as an input,
determining a value to write at the at least one memory address based on a value that was stored at another memory address in the volatile memory and the current value of the counter that was used as the input to the pseudorandom function, and
writing the value at the at least one memory address;
the processor further configured to perform a validation procedure across at least the portion of volatile memory once the pattern has been written to the portion of volatile memory, the validation procedure indicating an expected result;
the transceiver further configured to receive a challenge response from the device; and
the processor further configured to compare the expected result to the challenge response.

19. The TM as in claim 18, wherein the validation procedure comprises an integrity check, and the integrity check is performed over memory values corresponding to an expected operational image of an operating system of the device and across at least the at least one portion of volatile memory.

20. A device comprising:
volatile memory comprising at least a portion of an operational image of an operating system and at least one portion of unused volatile memory; and a processor configured to:
   determine a plurality of challenge parameters, wherein the plurality of challenge parameters are associated with a challenge that is intended to bring the volatile memory to a known state for validation, and the plurality of challenge parameters comprise an indication of a memory region and a random number;
   write a pattern to the at least one portion of unused volatile memory, wherein writing the pattern to the at least one portion of unused volatile memory comprises:
   initializing a counter,
   selecting at least one memory address on which the pattern is written based on a result of a pseudorandom function that takes a current value of the counter as an input,
   determining a value to write at the at least one memory address based on a value that was stored at another memory address in the volatile memory and the current value of the counter that was used as the input to the pseudorandom function, and
   writing the value at the at least one memory address;
   determine that the volatile memory is ready for validation in accordance with the challenge; and
   perform a validation procedure on the volatile memory.

21. The device as in claim 20, wherein the validation procedure comprises an integrity check, and the integrity check is performed over at least memory values corresponding to at least the portion of the operational image of the operating system and across the at least one portion of unused volatile memory.

* * * * *